(12) United States Patent
Song

(10) Patent No.: US 12,442,585 B2
(45) Date of Patent: Oct. 14, 2025

(54) REFRIGERATOR

(71) Applicant: LG Electronics Inc., Seoul (KR)

(72) Inventor: Seongmin Song, Seoul (KR)

(73) Assignee: LG Electronics Inc., Seoul (KR)

( * ) Notice: Subject to any disclaimer, the term of this patent is extended or adjusted under 35 U.S.C. 154(b) by 412 days.

(21) Appl. No.: 17/988,381

(22) Filed: Nov. 16, 2022

(65) Prior Publication Data
US 2023/0152030 A1 May 18, 2023

(30) Foreign Application Priority Data
Nov. 16, 2021 (KR) .................. 10-2021-0157935

(51) Int. Cl.
F25D 23/02 (2006.01)
F25D 27/00 (2006.01)

(52) U.S. Cl.
CPC .......... *F25D 23/028* (2013.01); *F25D 27/00* (2013.01); *F25D 2400/18* (2013.01)

(58) Field of Classification Search
CPC ... A47B 2096/208; A47B 96/20; F25D 23/02; F25D 23/028; F25D 2323/02; F25D 2400/18; F25D 2400/36; F25D 27/00; F25D 27/005
See application file for complete search history.

(56) References Cited

U.S. PATENT DOCUMENTS 8,789,900 B2 7/2014 Laible et al.
8,813,458 B2 * 8/2014 Geng ................ F16B 5/126
52/312
10,514,199 B2 12/2019 Lee
10,808,994 B2 10/2020 Lee et al.
11,193,229 B2 * 12/2021 Ayers ................ A47L 15/4265
2009/0045705 A1 2/2009 Laible et al.
2018/0164030 A1 * 6/2018 Lee ................ F25D 27/00
(Continued)

FOREIGN PATENT DOCUMENTS

CN 103250018 8/2013
EP 3640392 4/2020
(Continued)

OTHER PUBLICATIONS

Extended European Search Report in European Appln. No. 22207773.7, dated Apr. 3, 2023, 9 pages.
(Continued)

*Primary Examiner* — Andrew Roersma
(74) *Attorney, Agent, or Firm* — Fish & Richardson P.C.

(57) ABSTRACT

A refrigerator includes a cabinet, in which a storage space is defined, and a door configured to open and close the storage space. The door includes a door body and a panel assembly mounted in front of the door body. The panel assembly includes a lighting device configured to irradiate light, a panel which is configured to define a front surface of the door and through which light is transmitted, a light guide plate provided behind the panel to guide the light irradiated from the lighting device to the panel, and an upper bracket provided above the panel to define a top surface of the panel assembly. The light guide plate extends more upward than an upper end of the panel, and an extending upper end of the light guide plate is accommodated in the upper bracket.

20 Claims, 27 Drawing Sheets

(56) References Cited

U.S. PATENT DOCUMENTS

| | | | | |
|---|---|---|---|---|
| 2019/0360745 A1* | 11/2019 | Lee | .................. | G02B 6/0065 |
| 2021/0318061 A1* | 10/2021 | Lee | .................. | F25D 23/028 |
| 2023/0018403 A1* | 1/2023 | Park | .................. | F25D 27/00 |
| 2024/0183606 A1* | 6/2024 | Kim | .................. | F25D 27/00 |

FOREIGN PATENT DOCUMENTS

| | | | |
|---|---|---|---|
| EP | 3693689 A1 | | 8/2020 |
| KR | 20180067382 | | 6/2018 |
| WO | WO-2021212934 A1 | * | 10/2021 |

OTHER PUBLICATIONS

Notice of Allowance in European Appln. No. 22207773.7, mailed on Feb. 21, 2025, 5 pages.

\* cited by examiner

REFRIGERATOR

CROSS-REFERENCE TO RELATED APPLICATIONS

The present application claims priority under 35 U.S.C. 119 and 35 U.S.C. 365 to Korean Patent Application No. 10-2021-0157935, filed on Nov. 16, 2021, which is hereby incorporated by reference in its entirety.

BACKGROUND

The present disclosure relates to a refrigerator.

In general, home appliances are disposed in an indoor space and may be disposed to be harmonized with the surrounding space. In addition, to further improve the appearance of the home appliance, a panel defining an outer appearance on a front surface of the home appliance may be provided.

Typically, structures that variously modify the outer appearance of the front surface of the refrigerator so as to be harmonized with environments in which the refrigerator is placed, surrounding furniture, or other home appliances are being developed, and this trend is being made throughout the home appliances.

U.S. Pat. No. 8,789,900 discloses a structure in which a decoration panel defining an outer appearance is installed on a door front of a refrigerator, and here, the outer appearance of the door front is defined according to a user's preference by detachably configuring the decoration panel.

However, the refrigerator having this structure has a problem in that, when a user wants to change the outer appearance, the entire decoration panel needs to be removed and replaced, and it is not possible to use the decoration panel before replacement any longer.

To solve this limitation, Chinese Patent Application No. 103250018 discloses a refrigerator in which a reflective layer and a transparent panel are disposed on a door front and colored light emitting members are mounted on both side ends of the reflective layer to cause the transparent panel to shine with set color.

However, in such a structure, since the light emitting member is disposed further inside the panel defining the front surface of the door, shadows are generated at both ends of the door during an operation of the light emitting member to cause a poor outer appearance.

In addition, since the light emitting members are disposed at both the ends of the door, an amount of light at a central portion may be insufficient, and thus, brightness may decrease. Thus, there is a limitation in that it is not possible to secure a uniform amount of light over the entire front surface of the door.

In particular, when the entire front surface of the door is illuminated in a structure in which a size of the door is large, an imbalance of luminance may increase, and there is a serious limitation in that quality of the outer appearance is deteriorated.

To prevent this limitation from occurring, Korean Patent Application No. 10-2018-0067382 discloses a refrigerator in which a light guide plate is provided inside a door, and an LED is provided below the light guide plate to irradiate light toward a front surface of the door.

However, in such a structure, the light guide plate has a size less than that of a front panel defining the front surface of the refrigerator door, and thus, an outer circumferential portion of a front plate is reduced in brightness. As a result, there is a limitation in that the entire front plate is not brightly illuminated.

In addition, the front plate may have a bezel portion disposed along a circumference thereof, and thus, there is a limitation in that a structure in which the entire door is illuminated in the same color is not realized.

SUMMARY

Embodiments provide a refrigerator capable of illuminating an entire front surface of a panel with uniform brightness.

Embodiments also provide a refrigerator capable of illuminating brightly the outermost end of a panel without shading.

Embodiments also provide a refrigerator having a stable mounting structure in a state in which a size of a light guide plate is maximized.

Embodiments also provide a refrigerator having a structure in which a panel, a light guide plate, and a mounting member are fixed at the same time.

Embodiments also provide a refrigerator in which, when a light guide plate is expanded, the light guide plate is prevented from being bent, and a sufficient expansion space is provided.

In one embodiment, a refrigerator includes a cabinet, in which a storage space is defined, and a door configured to open and close the storage space, wherein the door includes: a door body; and a panel assembly mounted in front of the door body, wherein the panel assembly includes: a lighting device configured to irradiate light; a panel which is configured to define a front surface of the door and through which light is transmitted; a light guide plate provided behind the panel to guide the light irradiated from the lighting device to the panel; and an upper bracket provided above the panel to define a top surface of the panel assembly, wherein the light guide plate extends more upward than an upper end of the panel, and an extending upper end of the light guide plate is accommodated in the upper bracket.

A groove in which the upper end of the light guide plate is accommodated may be defined in a bottom surface of the upper bracket, which faces the upper end of the light guide plate.

The groove may be a region that is defined concavely upward with respect to a front end of the bottom surface of the upper bracket.

The light guide plate may be configured to be expanded and contracted by heat, and the groove may be recessed more upward than a maximum expansion height of the light guide plate.

The refrigerator may further include a mounting member made of a light-transmittable material and provided between the panel and the light guide plate so that the light guide plate is mounted thereon.

The mounting member may include: a front surface portion which has the form of a plate passing between the panel and the light guide plate and on which the panel is disposed in front thereof; and a side surface portion which extends backward from each of both ends of the front surface portion and to which both ends of the light guide plate are coupled.

The front surface portion may extend equal to or higher than the upper end of the panel.

An upper end of the front surface portion may be further accommodated in the upper bracket.

A groove may be defined in a bottom surface of the upper bracket, wherein the groove may include: a light guide plate accommodation portion in which the upper end of the light guide plate is accommodated; and a mounting member accommodation portion defined in front of the light guide plate accommodation portion to accommodate an upper end of the front surface portion, wherein the light guide plate accommodation portion and the mounting member accommodation portion may be defined in one groove.

A horizontal length of the mounting member accommodation portion may be greater than that of the light guide plate accommodation portion.

The groove may have a shape corresponding to a cross-sectional shape of the front surface portion and the light guide plate in the state in which the light guide plate is mounted on the mounting member, and the upper ends of the front surface portion and the light guide plate may be inserted into the groove.

The side surface portion may extend along both left and right ends of the mounting member, a light guide plate insertion space which is opened vertically and into which both ends of the light guide plate are inserted may be defined in the side surface portion, and the upper and lower ends of the light guide plate may extend further via upper and lower ends of the side surface portion.

A groove may be defined in a bottom surface of the upper bracket, an upper end of the side surface portion may be stepped with respect to an upper end of the front surface portion, and the upper end of the front surface portion may be inserted into the groove, and the upper end of the side surface portion may be supported on the bottom surface of the upper bracket.

A bracket protrusion protruding downward may be disposed on a front end of the upper bracket, and a lower end of the bracket protrusion may protrude to a height less than that of the upper end of the light guide plate.

The bracket protrusion may protrude toward the upper end of the panel to shield the upper end of the light guide plate at a front side.

A top surface of the upper bracket may include: a horizontal portion extending from a rear end of the upper bracket; and an inclined portion that is gradually lowered forward from an end of the horizontal portion, wherein the bracket protrusion may protrude downward from a front end of the inclined portion.

A lower end of the light guide plate may extend further downward than a lower end of the panel.

The refrigerator may further include a lower bracket provided below the panel to define a bottom surface of the panel assembly, wherein the lighting device may be provided inside the lower bracket to irradiate light to the lower end of the light guide plate.

The lower end of the panel may be supported on an upper end of a front surface portion of the lower bracket, and the lower end of the light guide plate may be inserted into the lower bracket via the upper end of the front surface portion.

A reflective layer configured to reflect the light, which is directed to the outside of the light guide plate, to the inside of the light guide plate may be provided on each of the upper end and both left and right ends of the light guide plate.

The details of one or more embodiments are set forth in the accompanying drawings and the description below. Other features will be apparent from the description and drawings, and from the claims.

BRIEF DESCRIPTION OF THE DRAWINGS

FIG. 22 is a front view illustrating an outer appearance of the front surface of the refrigerator that is in a state in which the lighting device is turned on.

FIG. 28 is a front view illustrating an outer appearance of a front surface of a refrigerator in a state in which a lighting device of the refrigerator is turned on.

DETAILED DESCRIPTION OF THE EMBODIMENTS

Hereinafter, detailed embodiments will be described in detail with reference to the accompanying drawings. However, the present disclosure is limited to the embodiments in which the spirit of the present invention is proposed, and other degenerate idea or other embodiments included in the scope of the present invention may be easily proposed by addition, changes, deletions, etc. of other elements.

Prior to a description, directions are defined. In an embodiment of the present disclosure, a direction toward a door is defined as a front direction with respect to a cabinet shown in FIGS. 2 and 2, a direction toward the cabinet with respect to the door is defined as a rear direction, a direction toward a bottom on which a refrigerator is installed is defined as a downward direction, and a direction away from the bottom is defined as an upward direction.

Figure 1:
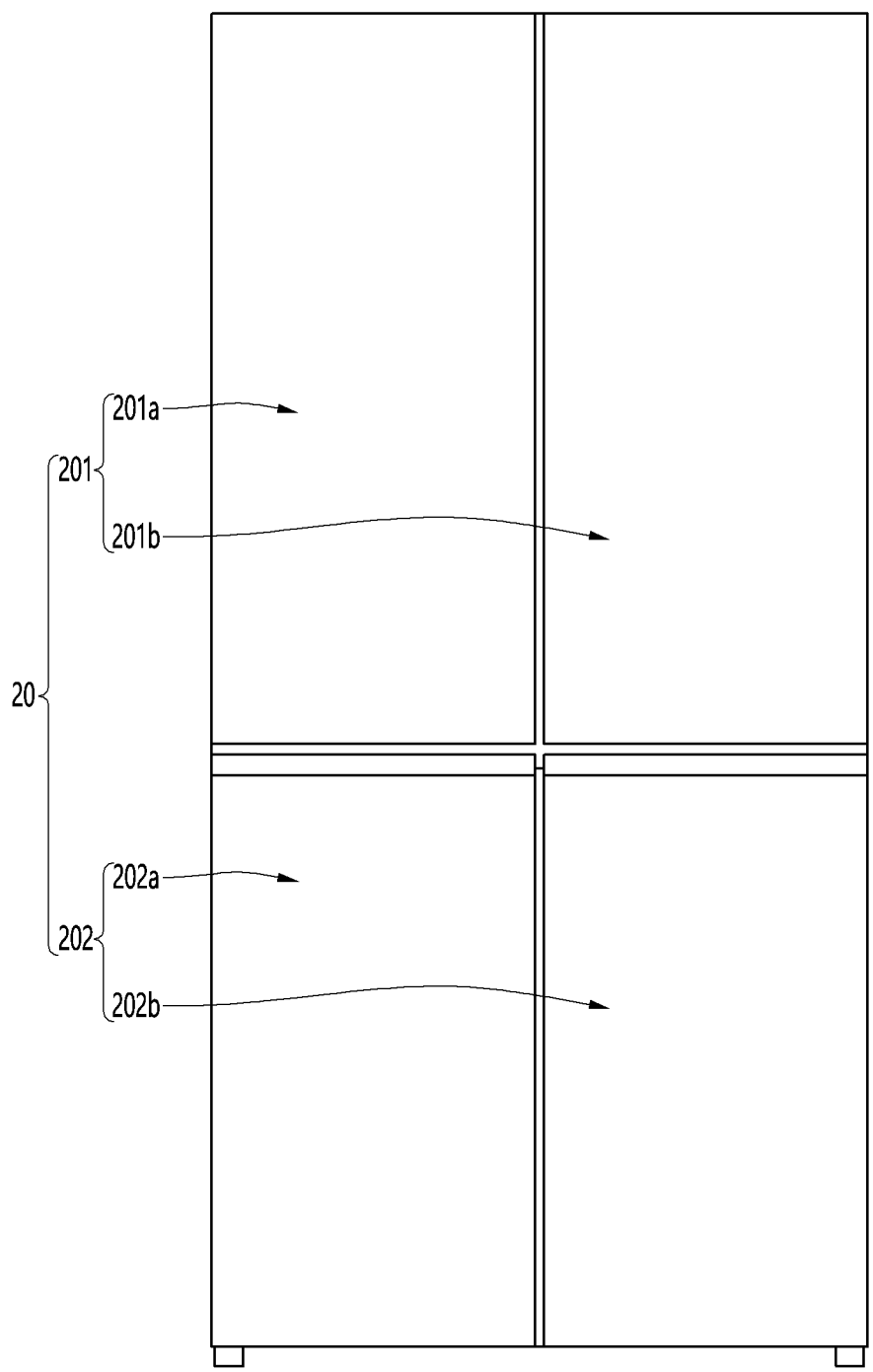
FIG. 1 is a front view of a refrigerator according to an embodiment.
Figure 2:
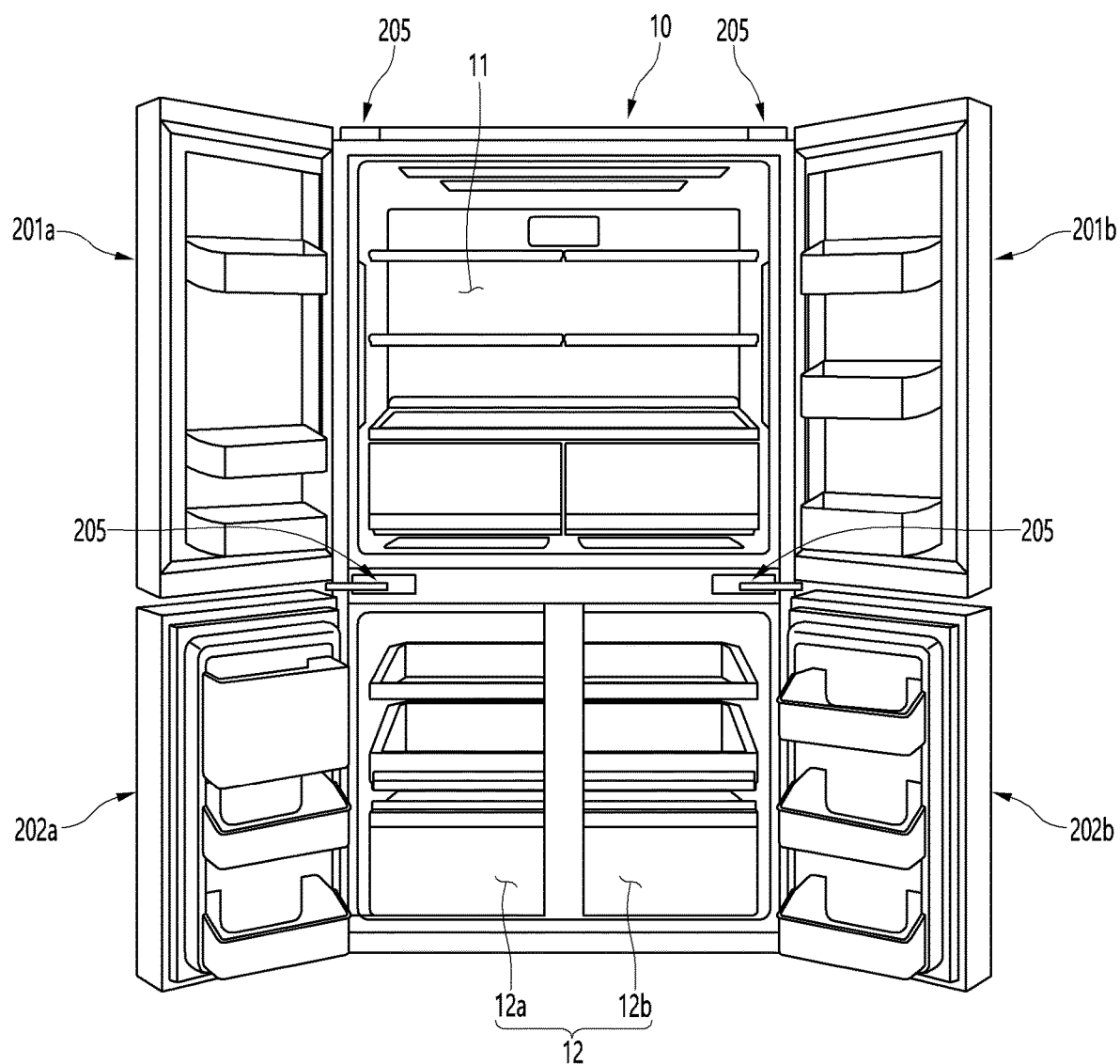
FIG. 2 is a front view illustrating a state in which a door of the refrigerator is opened.

FIG. 1 is a front view of a refrigerator according to an embodiment. Also, FIG. 2 is a front view illustrating a state in which a door of the refrigerator is opened.

As illustrated in the drawings, an outer appearance of a refrigerator 1 according to an embodiment may be defined by a cabinet 10 in which a storage space is defined, and a door 20 for opening and closing the storage space of the cabinet 10.

For example, the cabinet 10 may define the storage space partitioned in a vertical direction. Here, a refrigerating compartment 11 may be defined at an upper portion of the cabinet 10, and a freezing compartment 12 may be defined at a lower portion of the cabinet 10. The refrigerating compartment 11 may be referred to as an upper storage space, and the freezing compartment 12 may be referred to as a lower storage space. In addition, the freezing compartment 12 may be divided into left and right sides to define a left freezing chamber 12a and a right freezing chamber 12b. The left freezing compartment 12a may be referred to as a left lower storage space, and the right freezing compartment 12b may be referred to as a right lower storage space.

The door 20 may be configured to open and close each of the refrigerating compartment 11 and the freezing compartment 12. For example, the door 20 may be rotatably mounted to the cabinet 10, and each of the refrigerating compartment 11 and the freezing compartment 12 may be opened and closed by the rotation. Of course, the door 20 may also be withdrawn to open and close each of the refrigerating compartment and the freezing compartment.

The door 20 may include a refrigerating compartment door 201 that opens and closes the refrigerating compartment 11 and a freezing compartment door 202 that opens and closes the freezing compartment 12. The refrigerating compartment door 201 may be referred to as an upper door, and the freezing compartment door 202 may be referred to as a lower door.

The refrigerating compartment door 201 may include a pair of a left refrigerating compartment door and a right refrigerating compartment door, which are arranged side by side. The left refrigerating compartment door 201a and the right refrigerating compartment door 201b may be disposed adjacent to each other and may have the same size. In addition, the left refrigerating compartment door 201a and the right refrigerating compartment door 201b may independently rotate to open and close the refrigerating compartment 11.

Upper and lower ends of the refrigerating compartment door 201a and the freezing compartment door 201b may be coupled to the cabinet 10 by hinge devices 205, respectively.

The hinge device 205 may include an upper hinge 205 and a lower hinge 205, and the refrigerator compartment door 201a and the freezing compartment door 201b may be rotatably mounted thereon.

In addition, the freezing compartment door 202 may include a pair of a left freezing compartment door 202a and a right freezing compartment door 202b, which are arranged side by side. In addition, the left freezing compartment door 202a and the right freezing compartment door 202b may independently rotate to open and close the freezing compartment. The left freezing compartment door 202a and the right freezing compartment door 202b may be disposed adjacent to each other and may have the same size.

Of course, although the refrigerator having a structure in which a refrigerating compartment 11 is disposed at an upper side, and a freezing compartment 12 is disposed at a lower side is described as an example in the embodiment, the present disclosure may be applied to all types of refrigerators equipped with a door without being limited to types of refrigerators.

An outer appearance of the front surface of the refrigerator 1 may be defined in the state in which the door 20 is closed and may define the out appearance of the refrigerator 1 viewed from the front in the state in which the refrigerator 1 is installed.

The door 20 may have a structure in which a front surface selectively emits light and may be configured to shine with set color or brightness. Thus, a user may change front color or brightness of the door 20 without separating or disassembling the door 20 and may change the overall outer appearance of the refrigerator 1.

Hereinafter, the structure of the door 20 will be described in detail with reference to drawings. In addition, an embodiment of the present disclosure will be described with reference to the left refrigerating compartment door 201a, and other doors 201b, 202a, and 202b may also have the same structure.

Figure 3:
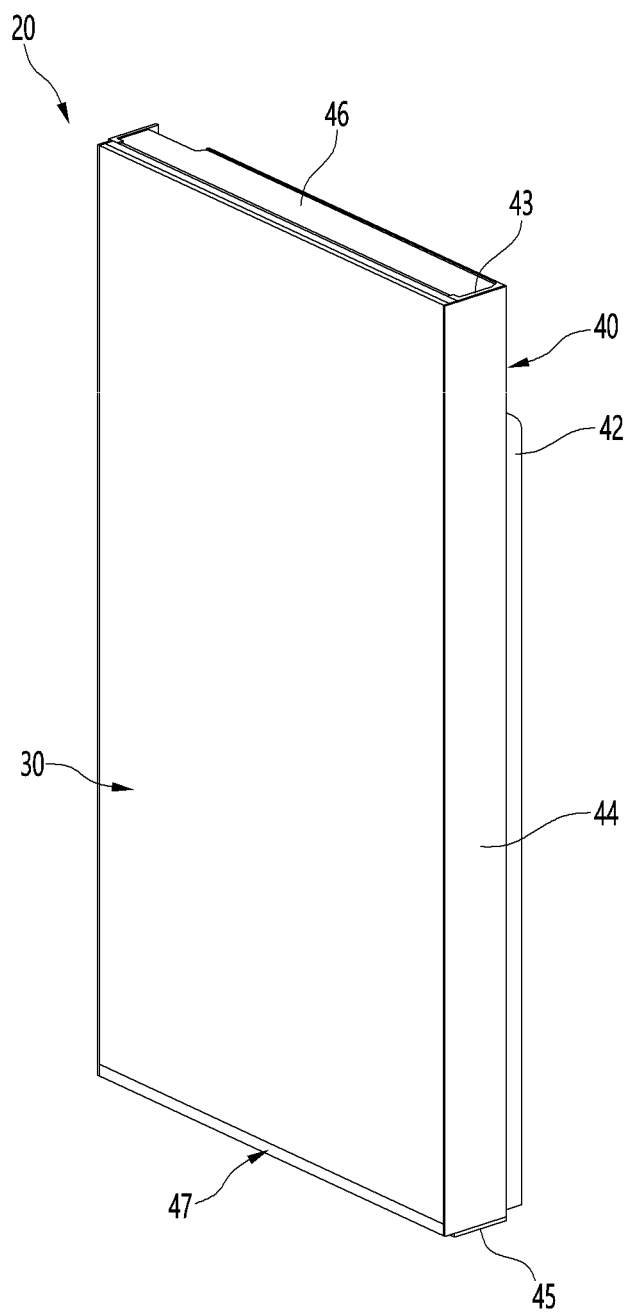
FIG. 3 is a perspective view of the door.
Figure 4:
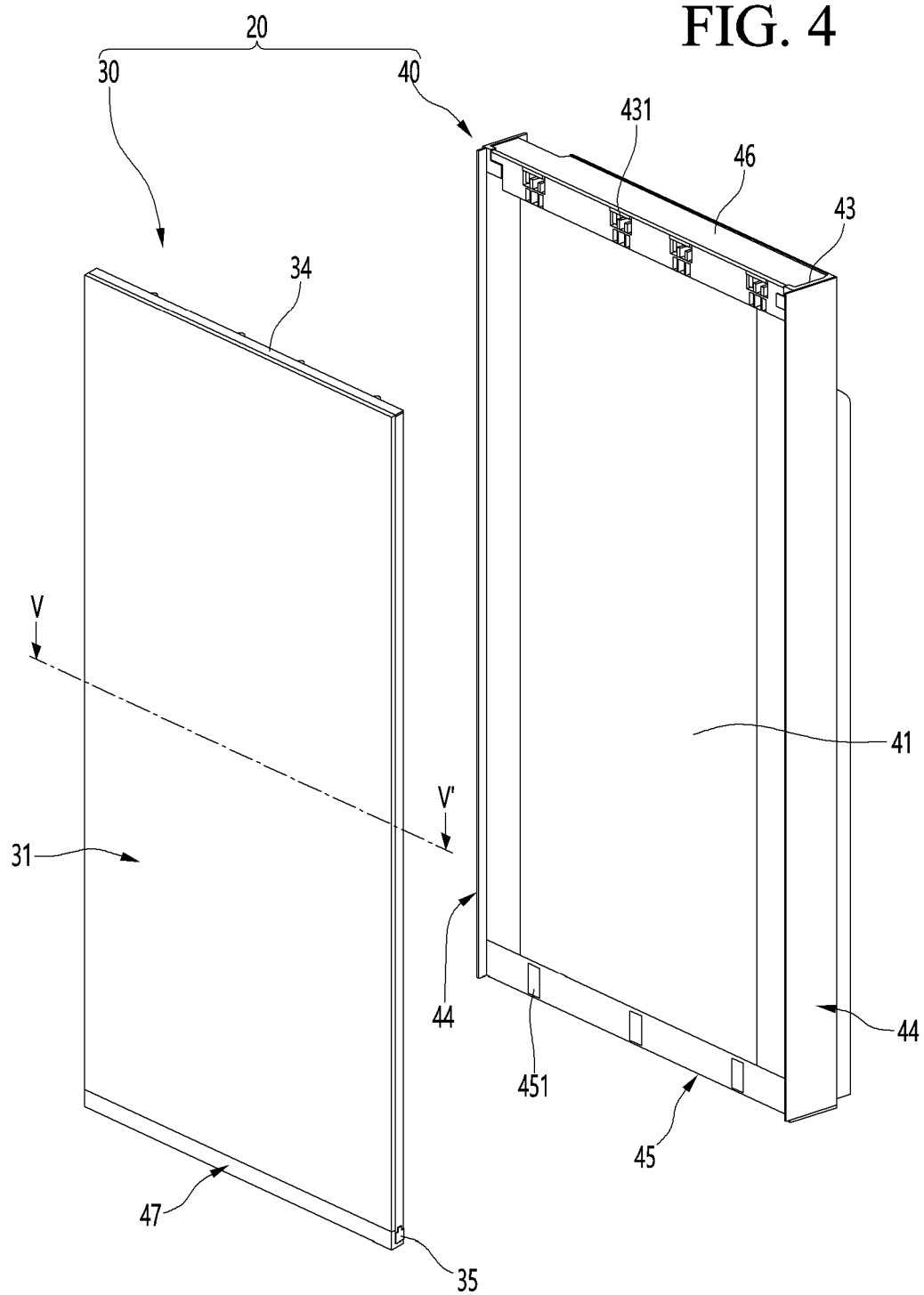
FIG. 4 is an exploded perspective view illustrating a state in which a panel assembly and a door body, which are components of the door, are separated from each other.

FIG. 3 is a perspective view of the door. In addition, FIG. 4 is an exploded perspective view illustrating a state in which a panel assembly and a door body, which are components of the door, are separated from each other.

As illustrated in the drawings, the door 20 may include a door body 21 defining the overall shape of the door 20, and a panel assembly 30 defining an outer appearance of a front surface of the door 20. That is, the door 20 may be configured so that the panel assembly 30 is mounted on a front surface of the door body 40.

The door body 40 may include a body plate 41 defining a front surface and a door liner 42 defining a rear surface. The body plate 41 may be made of a metal material and disposed to face a rear surface of the panel assembly 30. The door liner 42 may be made of a plastic material and may form a bottom shape of the door 20.

The door body 40 may include a side decoration 44 defining right and left side surfaces of the door body 21. The side decoration 44 may connect both right and left ends of the body plate 41 and both right and left ends of the door liner 42.

The door body 40 may include an upper cap decoration 43 and a lower cap decoration 45 that form top and bottom surfaces of the door body 40. The upper cap decoration 43 may be connected to an upper end of the side decoration 44, an upper end of the body plate 41, and an upper end of the door liner 42. The lower cap decoration 45 may be connected to a lower end of the side decoration 44, a lower end of the body plate 41, and a lower end of the door liner 42.

An outer appearance of the door body 40 may be defined by the body plate 41, the door liner 42, the side decoration 44, the upper cap decoration 43, and the lower cap decoration 45. In addition, an insulator may be filled in an internal space of the door body 40, which is defined by coupling the body plate 41, the door liner 42, the side decoration 44, the upper cap decoration 43, and the lower cap decoration 45.

The panel assembly 30 may be inserted into and mounted on the front surface of the door body 40. For example, the side decoration 44 may further protrude forward and may be in contact with both ends of the panel assembly 30. In addition, a top surface of the panel assembly 30 may define the same plane as the upper cap decoration 43 to define the top surface of the door 20, and the bottom surface of the panel assembly 30 has the lower cap decoration 45 to define the same plane as the bottom surface of the door 20.

The panel assembly 30 may be provided in a plate shape and may define an outer appearance of the front surface of the door 20 while being mounted on the front surface of the door body 40. Since the panel assembly 30 may form the outer appearance of the front surface of the door 20, the panel assembly 30 may be referred to as a door panel, and since the panel assembly 30 may form the outer appearance of the front surface of the refrigerator 1, the panel assembly 30 may also be referred to as an exterior panel.

The panel assembly 30 may be detachably mounted on the door body 40. An upper protrusion 343 and a lower protrusion 473, which protrude backward, may be disposed on upper and lower ends of the rear surface of the panel assembly 30, respectively. In addition, an upper mounting portion 431 on which an upper protrusion 343 is inserted and mounted may be opened at an upper end of the front surface of the door body 40, and a lower mounting portion 451 on which the lower protrusion 473 is inserted and mounted may be opened at a lower end of the front surface of the door body 40.

In addition, although not shown in detail, the upper protrusion 343 may be restricted by an upper cover 46 mounted on an opened top surface of the upper cap decoration 43. In addition, the panel assembly 30 may include a lower decoration 47. The lower decoration 47 may define an outer appearance of the lower end of the panel assembly 30, and the lower end of the panel assembly 30 may be fixed to the door body 40.

The lower decoration 47 may be made of a plastic material and may be coupled under the lower bracket 35 to shield the lower bracket 35. That is, in the state in which the panel assembly 30 is mounted on the door body 40, the lower bracket 35 may not be exposed by the lower decoration 47 and be coupled to the door body 40.

The lower decoration 47 may be provided with a lower protrusion 473 to which a screw restricting the lower end of the panel assembly 30 is coupled, and the lower protrusion 473 may be firmly mounted on the lower restriction portion 451 of the lower end of the door body 40.

Thus, the panel assembly 30 may be detachably mounted from the door body 40 for services and maintenance.

A front surface of the panel assembly 30 may be exposed forward in the state in which the panel assembly 30 is mounted on the door body 40, and the panel assembly 30 may substantially form the outer appearance of the front surface of the door 20. That is, a color of the outer appearance of the front surface of the door 20 may be determined by a color of the front surface of the panel assembly 30. In addition, the entire front surface of the panel assembly 30 may be configured to shine in a color specified by the user and may be changed to various colors selected by the user to express the color of the front surface of the door 20 in various manners.

Hereinafter, the structure of the panel assembly 30 will be described in more detail with reference to drawings.

Figure 5:
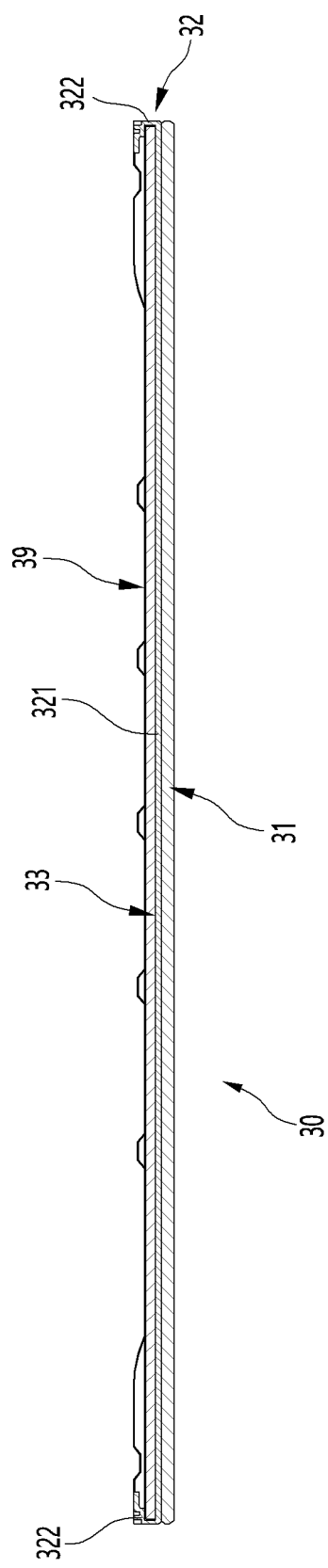
FIG. 5 is a cross-sectional view taken along line V-V' of FIG. 4.
Figure 6:
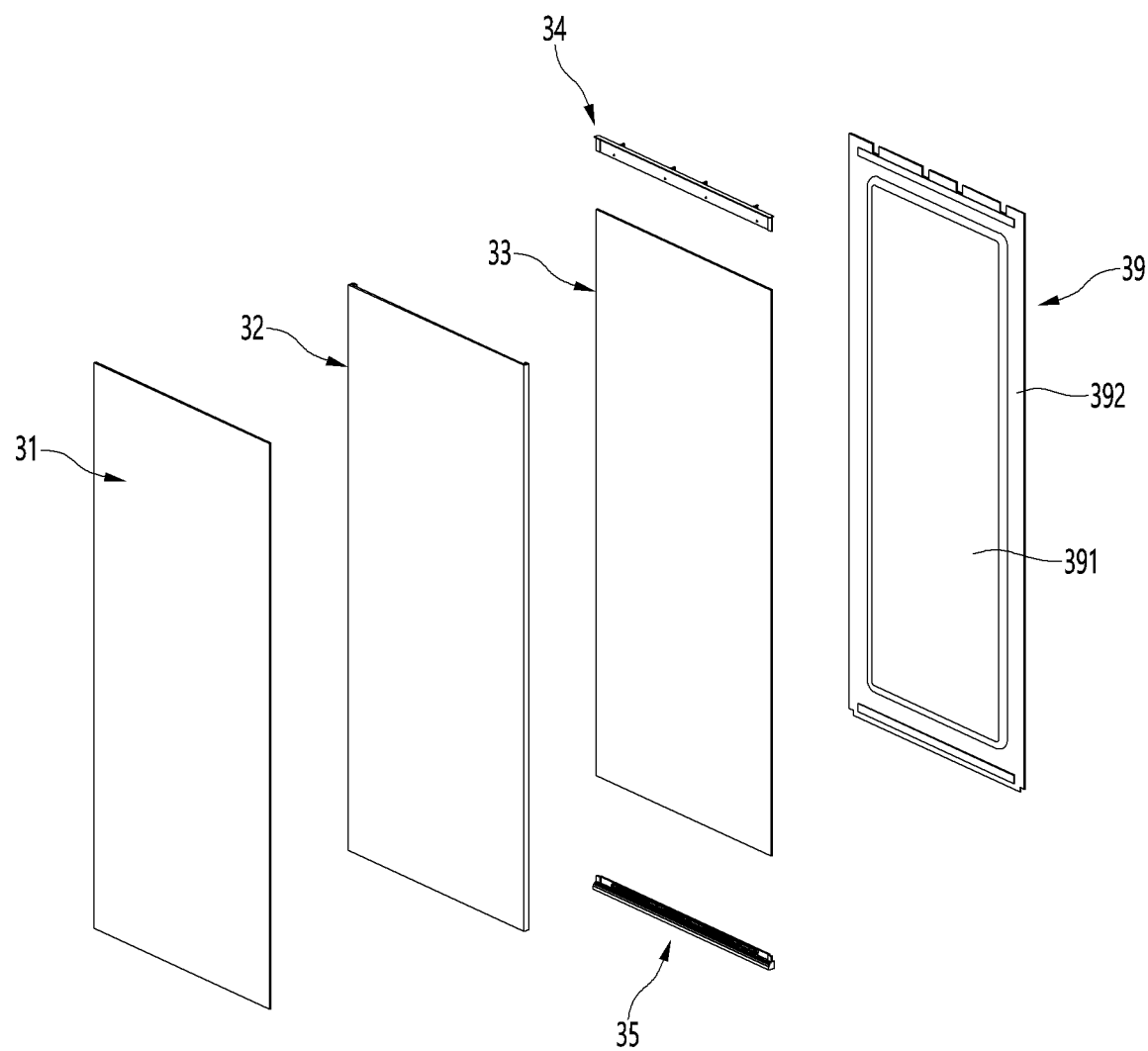
FIG. 6 is an exploded front perspective view illustrating the panel assembly.

FIG. 5 is a cross-sectional view taken along line V-V' of FIG. 4. In addition, FIG. 6 is an exploded front perspective view illustrating the panel assembly.

As illustrated in the drawings, the panel assembly 30 may include a panel 31 forming an outer appearance of the front surface, the lighting device 36 emitting light to cause the panel 31 to shine, and a light guide plate 33 guiding light emitted from the lighting device 36.

In addition, the panel assembly 30 may further include an upper bracket 34 disposed above the panel 31 to define a top surface of the panel assembly 30. In addition, the panel assembly 30 may include a mounting member 32 on which the light guide plate 33 and the panel 31 are mounted.

The panel assembly 30 may include an upper bracket 34 forming a top surface of the panel assembly 30 and a lower bracket 35 forming a bottom surface of the panel assembly 30. The lighting device 36 may be mounted on the lower bracket 35. The panel assembly 30 may further include a back cover 39 forming a rear surface.

In more detail, the panel 31 may be provided in a rectangular plate shape and may be made of a material that transmits light therethrough. For example the panel 31 may be made of a glass material such as blue glass, white glass, and vapor deposition glass or may be made of other materials for transmitting light therethrough, such as ABS, PMMA, or PC. In addition, the panel 31 may have a thickness set so as not to be easily broken due to characteristics of defining an outer appearance thereof. The panel 31 may have a thickness greater than that of the light guide plate 33. For example, the panel 31 may have a thickness of approximately 3 mm to 5 mm. The panel 31 may be referred to as a transparent plate or an out plate.

The panel 31 may be transparent to allow light reflected by the light guide plate 33 to be transmitted. In this case, the transparency may be defined as a degree to which the light reflected from the light guide plate 33 is transmitted and irradiated to the outside to identify that the panel 31 shines in a specific color.

In addition, in all embodiments of the present disclosure, the terms "transparent" and "transmission" may be defined as a state in which the light passes to display a set color through the panel 31.

In addition, the panel 31 may be provided to have a color. That is, in a state in which the lighting device 36 is turned off, a color of the front surface of the door may be expressed by the color of the panel. The color of the panel may not be changed in a state in which the lighting device is turned off, and the user may select and install a color desired by the user through replacement of the panel assembly.

For example, a specific design or pattern may be printed on the panel 31 to have specific color. A film with a specific design or pattern printed thereon may be added to the panel 31, surface treatment such as imprinting, etching, and glass printing may be performed on the panel 31, or a coating or deposition layer having specific color and texture may be provided to define an outer appearance of the panel 31.

The front plate 31 may be configured to transmit light emitted from the lighting device 36 but components behind the front plate 31 may not be seen therethrough. That is, in the state in which the lighting device 36 is turned off, components inside the panel assembly 30 may be prevented from being seen to the outside through the panel 31 due to the color of the panel 31.

Here, the panel 31 may be provided with a color layer 311 having a color. Here, in an off state, the color layer 311 may have at least color having brightness equal to or greater than 0 other than black. That is, in a state in which the refrigerator 1 is installed, the front surface of the refrigerator 1 may be displayed in a color other than black, and the color of the front surface of the refrigerator may be changed according to an operation of the lighting device 36.

The panel 31 may define the outer appearance of the front surface of the panel assembly 30, which is exposed to the outside. The panel 31 may have a size less than that of the light guide plate 33. Thus, the light emitted from the light guide plate toward the panel may be evenly irradiated to the entirety including an outer end of the panel, and the entire panel may be brightly shine without being partially darkened.

In addition, a rear surface of the panel 31 may be mounted on a front surface of the mounting member 32. Here, a horizontal width of the panel 31 may correspond to a horizontal width of the mounting member 32. Thus, in the state in which the panel 31 is mounted, both left and right ends of the mounting member 32 and both left and right ends of the panel 31 may be disposed on the same plane and define both left and right surfaces of the panel assembly 30. Thus, in the state in which the panel 31 is attached to the mounting member 32, when viewed from the front, the components disposed behind the panel in addition to the mounting member 32 may not be exposed to the outside, and the outer appearance of the front surfaces of the panel assembly 30 and the door 20 may be defined.

The light guide plate 33 may be positioned at a rear spaced apart from the panel 31 and may be configured to guide light emitted from the lighting device 36 disposed below the light guide plate 33 forward toward the panel 31.

For example, the light guide plate 33 may be made of a transparent acrylic, plastic, or transparent polymer material. The light guide plate 33 may have a diffusing agent added thereto for diffusing light entrance on the light guide plate 33 or a pattern for diffusing light may be further formed on the light guide plate 33. Thus, light may be transferred to the panel 31 by the light guide plate 33, and in this case, a pattern of the light guide plate 33 may be set to cause the entire front surface of the panel 31 to shine with uniform brightness.

For example, the light guide plate 33 may have a pattern that increases in density upward from a center of the light guide plate 33 so as to have uniform brightness as a whole, and the density of the pattern may gradually increase from the center toward both left and right sides. In addition, the pattern may not be provided at a position closest to the lighting device 36 on the lower end of the light guide plate 33, or the density of the pattern may be provided to be relatively low.

The light guide plate 33 may be entirely provided in a rectangular plate shape and may be formed with a size somewhat greater than that of the panel 31. In detail, the light guide plate may have a width less than that of a left and right width of the panel 31 and greater than a vertical length of the panel 31 so as to be mounted on the mounting member 32.

In addition, although not shown in detail, a reflective layer 331 may be disposed on a rear surface of the light guide plate 33 so that light inside the light guide plate 33 is directed forward. Thus, the light moving along the light guide plate 33 may be induced to be irradiated toward the panel 31. In addition, the reflective layer may be disposed on each of both ends and an upper end of the light guide plate 33 except for the lower side, on which the lighting device 36 is mounted, so that all the light is directed to the inside of the light guide plate 33 without leaking around the light guide plate 33, and thus, the panel 31 may shine more brightly and uniformly.

The light guide plate 33 may be supported by the back cover 39 from the rear and may be fixed to be maintained at a predetermined interval from the panel 31 by the mounting member 32.

The mounting member 32 may be disposed between the panel 31 and the light guide plate 33. The mounting member 32 may be used to fixedly mount the light guide plate 33 and the panel 31, and in particular, may maintain the light guide plate 33 at a predetermined interval from the panel 31.

The mounting member 32 may have a front surface supporting the panel 31 and both left and right surfaces that restrict the light guide plate 33 disposed at a rear side thereof. The mounting member 32 may be referred to as a support member because the panel 31 and the light guide plate 33 are mounted and may also be referred to as a transparent plate because light passes therethrough. In addition, the mounting member 32 may be referred to as a main frame because the mounting member 32 has a structure including the side surface of the panel assembly 340.

The mounting member 32 may be made of a material capable of transmitting light therethrough and may be provided as a whole by injection or extrusion as a single component. That is, the mounting member 32 may be made of a material having a property of allowing light to pass through and having moldability. For example, the mounting member 32 may be made of an optically transparent ABS material. In addition, the mounting member 32 may be made of various transparent plastic materials, such as polycarbonate (PC), acrylic, or the like. The light reflected from the light guide plate 33 may be transmitted to pass through the panel 31.

The light transmission performance and transparency of the mounting member 32 means a degree to which light irradiated from the rear light guide plate 33 passes through the mounting member 32 to illuminate the panel 31.

In addition, a light diffusing agent may be added when the mounting member 32 is molded. The light diffusing agent may diffuse the light passing through the mounting member 32 and may allow the light to be irradiated more evenly to the entire front panel 31.

The upper bracket 34 may be provided at an upper end of the panel assembly 30. The upper bracket 34 may form a top surface of the panel assembly 30. In addition, the upper bracket 34 may be injection-molded with a plastic material, and may provide a structure coupled to the mounting member 32 and a structure coupled to the back cover 39.

The upper bracket 34 may extend from an upper left end to a right end of the mounting member 32 and may shield the mounting member 32 of the panel assembly 30 and an upper end of the light guide plate 33 so as not to be exposed. In addition, the upper bracket 34 may shield at least a portion of the upper end of the panel 31. Thus, when viewed from above, a top surface of the panel 31 may be defined by the upper bracket 34, and other components constituting the panel assembly 30 may be prevented from being exposed upward.

The back cover 39 may be coupled to the rear surface of the upper bracket 34. That is, when the back cover 39 is coupled, the upper bracket 34 may support the upper end of the light guide plate 33 at the rear side.

The lower bracket 35 may be provided at the lower end of the panel assembly 30. The lower bracket 35 may form a bottom surface of the panel assembly 30. The lower bracket 35 may be injection-molded with a plastic material and may provide a structure coupled to the mounting member 32 and a structure coupled to the back cover 39.

The lighting device 36 may be mounted on the lower bracket 35. The lighting device 36 may be provided inside the lower bracket 35 to irradiate light toward the light guide plate 33 and may be assembled and mounted with the lower bracket 35 in the state of being mounted on the lower bracket 35.

The lower bracket 35 may be coupled to a lower end of the mounting member 32 and may extend from a left end to a right end of the lower end of the mounting member 32. The back cover 39 may be coupled to the rear surface of the lower bracket 35. When the back cover 39 is coupled, the lower bracket 35 may support the light guide plate 33 at the rear side.

Thus, during a process in which the panel assembly 30 is assembled, both right and left ends of the light guide plate 33 may be fixed by the mounting member 32, and the upper and lower ends of the light guide plate 33 may be supported by the upper bracket 34 and the lower bracket 35 at the rear side.

The back cover 39 may form a rear surface of the panel assembly 30 and may be coupled to the upper bracket 34 and the lower bracket 35. The back cover 39 may be made of a metal material such as stainless or aluminum. The back cover 39 may be formed with a size corresponding to the size of the panel assembly 30 and may form an entire shape of the rear surface of the panel assembly 30.

The rear surface of the light guide plate 33 may be supported by a cover protrusion 391 protruding on the center of the back cover 39, at the rear side. Thus, the light guide plate 33 may have a plate-shaped structure having a large size, but in the state in which the back cover 39 is mounted, the light guide plate 33 may have the overall stable support structure and may be maintained in the stably mounted state. The upper bracket 34 and the lower bracket 35 may be provided at positions corresponding to an upper end and a lower end of the back cover 39.

Right and left ends of a cover circumferential portion 392, which form a circumference of the back cover 39, may be in contact with the side surface portion 322 of the mounting member 32, and upper and lower ends of the cover circumferential portion 392 may be in contact with the upper bracket 34 and the lower bracket 35, respectively.

A plurality of screws 399 may be coupled to the upper and lower ends of the cover circumferential portion 392 and may be coupled to the upper bracket 34 and the lower bracket 35 through the back cover 39 to fixedly mount the back cover 39.

The structures of the mounting member 32, the lower bracket 35, the lighting device 36, and the upper bracket 34 will be described in more detail below with reference to the drawings.

Figure 7:
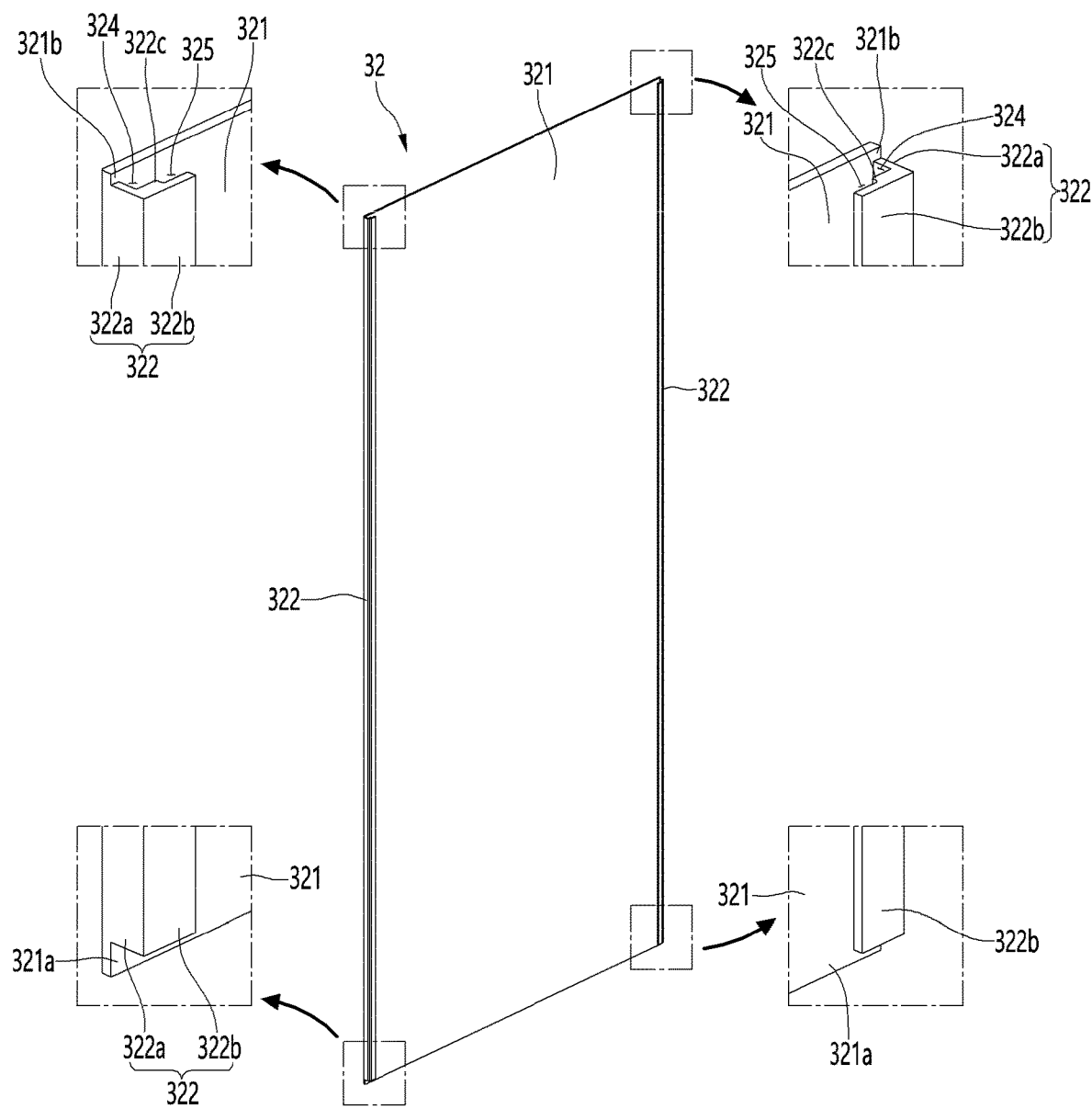
FIG. 7 is a rear perspective view illustrating a mounting member that is a component of the panel assembly.

FIG. 7 is a rear perspective view illustrating the mounting member that is a component of the panel assembly.

As illustrated in the drawing, the mounting member 32 may be entirely made of a resin material. Also, the panel 31 may be mounted on the front surface of the mounting member 32 with respect to the mounting member 32, and the light guide plate 33 may be disposed on the rear surface of the mounting member 32.

The mounting member 32 may include a front surface portion 321 having a plate shape, and a side surface portion 322 that protrudes backward from each of both right and left ends of the front surface portion 321. The front surface portion 321 may be disposed between the panel 31 and the light guide plate 33, the front surface may support the panel 31, and the rear surface may support the light guide plate 33.

The front surface portion 321 may be provided in the plate shape having a size corresponding to that of the panel 31, and an adhesive member 313 may be applied around the front surface portion 321 so that the panel 31 adheres to the mounting member 32. Here, the adhesive member 313 may be made of a transparent material or a material capable of transmitting light, and the panel 31 may be configured so that the entire area including an area to which the adhesive member 313 is applied shines.

A left and right width of the front surface portion 321 may be the same as a left and right width of the panel 31. In addition, the upper end of the front surface portion 321 may protrude more upward than the upper end of the panel 31, and the lower end of the front surface portion 321 may protrude more than the lower end of the panel 31. That is, the front surface portion 321 may have a size greater than that of the panel 31, and in particular, may have a length greater than a vertical length of the panel 31.

In addition, the front surface portion 321 may have a structure connecting the side surface portions 322 respectively disposed at both the left and right sides. That is, the front surface portion 321 may be continuously disposed between the side surface portion 322 and may extend from the side surface portion 322 at one side to the side surface portion 322 at the other side.

In the state in which the light guide plate 33 is mounted, the rear surface of the front surface portion 321 may be maintained in the state of being in contact with the front surface of the light guide plate 33. Thus, the light guide plate 33 may be always maintained at a constant distance from the panel 31. Here, the front surface portion 321 may be extruded to be maintained at set flatness, and thus, when the light guide plate 33 is mounted, the front surface portion 321 may be in contact with the entire front surface of the light guide plate 33. Thus, the molding may be performed to prevent an irregular interval or gap from occurring between the front surface portion 321 and the light guide plate 33.

The side surface portion 322 may be disposed along both the left and right ends of the light guide plate 33. The side surface portion 322 may be stepped with respect to upper and lower ends of the front surface portion 321 and may be provided to match side ends of the upper bracket 34 and the lower bracket 35.

The mounting member 32 may have the same cross-sectional structure in the vertical direction and thus may be simply molded by the extrusion. Simultaneously, a structure in which the panel 31 and the light guide plate 33 are mounted using the front surface portion 321 and the side surface portion 322 may be provided. In addition, the upper bracket 34 and the lower bracket 35 may be mounted through the structure of the side surface portion 322.

In detail, the side surface portion 322 may include a first part 322a extending backward from each of both left and right ends of the front surface portion 321 and a second part 323 bent from an end of the first part 322a.

The first part 322a may extend perpendicular to the front surface portion 321 from each of both the left and right ends of the front surface portion 321 and may define a side surface of the panel assembly 30.

The second part 322b may be bent inward from the extending end of the first part 322a. That is, the pair of second parts 322b that are disposed on the pair of the first parts 322a, respectively, may extend to face each other.

The second part 322b may extend perpendicular to the first part 322a and be provided to restrain the light guide plate 33 and also both ends of the upper bracket 34 and the lower bracket 35. In addition, the second part 322b may extend from an upper end to a lower end of the first part 322a and may support both left and right ends of the back cover 39.

A third part 322c may be disposed between the first part 322a and the second part 322b. The second part 322b and the third part 322c are disposed to correspond to a vertical length of the first part 322a and may extend from the upper end to the lower end of the first part 322a. In addition, the third part 322c may protrude from a front surface of the second part 322b, that is, a surface facing the front surface portion 321, and the front surface of the second part 322b has a stepped shape.

A light guide plate insertion space 324 and a bracket insertion space 325 may be defined in the side surface portion 322 by the first part 322a, the second part 322b, and the third part 322c, respectively.

In detail, the third part 322c may be disposed parallel to the front surface portion 321, and the light guide plate insertion space 324 may be defined between the front surface portion 321 and the third part 322c, which are spaced apart from each other. Here, the third part 322c may extend from a rear end of the first part 322a, and a distance between the front surface portion 321 and the third part 322c may be defined to correspond to a thickness of the light guide plate 33 so that the light guide plate 33 may be slidably inserted therein. Also, in the state in which the light guide plate 33 is inserted, both the left and right ends of the light guide plate 33 may be restricted to both the ends of the mounting member 32. Here, the front surface of the light guide plate 33 may be in contact with a rear surface of the front surface portion 321.

In addition, in the state in which the light guide plate 33 is inserted into the light guide plate insertion space 324, the lower end of the light guide plate 33 may be disposed to face the lighting device 36. In particular, the light guide plate 33 may be disposed on the same extension line as the light source 362 of the lighting device 36, and in the state in which the light guide plate 33 is fixedly inserted into the light guide plate insertion space 324, movement in forward and backward directions of the light guide plate 33 may be restricted.

That is, even if the door 20 is repeatedly opened and closed, the light guide plate 33 may be in contact with the front surface portion 321, may be maintained at a predetermined interval from the panel 31, and may not deviate from a position at which the light guide plate 33 is originally installed. The state in which the light guide plate 33 is disposed on the same extension line as the light source 362 included in the lighting device 36 may be maintained, and thus it may be possible to ensure that light emitted from the light source 362 is directed toward an end of the light guide plate 33.

In addition, the second part 322b may be disposed on the extending end of the third part 322c. The second part 322b may be disposed to be stepped with respect to the third part 322c and may be disposed more backward than the third part 322c. That is, the third part 322c may be disposed to protrude more forward than the front surface of the second part 322b.

The second part 322b may be disposed parallel to the front surface portion 321, and one side of each of the upper bracket 34 and the lower bracket 35 may be inserted into a space between the front surface portion 321 and the second part 322b. Particularly, the upper bracket 34 and the lower bracket 35 may be slidably inserted from upper and lower sides of the mounting member 32 while the light guide plate 33 is mounted on the side surface portion 322.

Here, a height of the stepped portion between the third part 322c and the second part 322b may correspond to a portion into which the upper bracket 34 and the lower bracket 35 are inserted, that is, a thickness of the upper bracket mounting portion 344 and the lower bracket mounting portion 352b. Thus, when the upper bracket 34 and the lower bracket 35 are mounted in the bracket insertion space 325 while the light guide plate 33 is mounted in the light guide plate insertion space, the upper and lower ends of the light guide plate 33 may be supported by the upper bracket 34 and the lower bracket 35.

The upper end and the lower end of the side surface portion 322 may be disposed to be stepped with respect to the upper end of the front surface portion 321. Here, the upper end of the front surface portion 321 may protrude further upward than the upper end of the side surface portion 322, and the lower end of the front surface portion 321 may protrude further downward than the lower end of the side surface portion 322.

In detail, an upper protrusion 321b and a lower protrusion 321a, which protrude further than the upper and lower ends of the side surface portion 322, may be respectively disposed on the upper and lower ends of the front surface portion 321. Thus, the upper bracket 34 and the lower bracket 35 mounted on the upper and lower ends of the mounting member 32 may be assembled with directionality to prevent erroneous assembly, and thus, the upper bracket 34 and the lower bracket 35 may be more firmly fixed and mounted.

That is, when the upper bracket 34 is mounted, both the left and right ends of the upper bracket 34 may be supported on the upper end of the side surface portion 322, and the front end of the upper bracket 34 may be supported on the upper protrusion 321b. Thus, the upper bracket 34 may have a structure that is supported by the side surface portion 322 and the front surface portion 321 at the same time and may have a temporary fixing structure even before the screw 399 is coupled. In addition, in a state in which the upper bracket 34 is completely mounted, the upper bracket 34 may be coupled to the front surface portion 321 and the side surface portion 322 to prevent distortion or deformation from occurring.

In addition, when the lower bracket 35 is mounted, both the left and right ends of the lower bracket 35 may be supported by the lower end of the side surface portion 322, and the front end of the lower bracket 35 may be supported by the lower protrusion 321a. Thus, the lower bracket 35 may have a structure that is supported by the side surface portion 322 and the front surface portion 321 at the same time.

As described above, the upper bracket 34 and the lower bracket 35 may be inserted into the bracket insertion space 325 and simultaneously may be seated on the stepped portions of the upper and lower ends of the side surface portion 322 and the front surface portion 321 so as to be firmly coupled to the mounting member 32. The upper bracket 34 and the lower bracket 35 may define top and bottom surfaces of the panel assembly 30 while being coupled to the mounting member 32.

Figure 8:
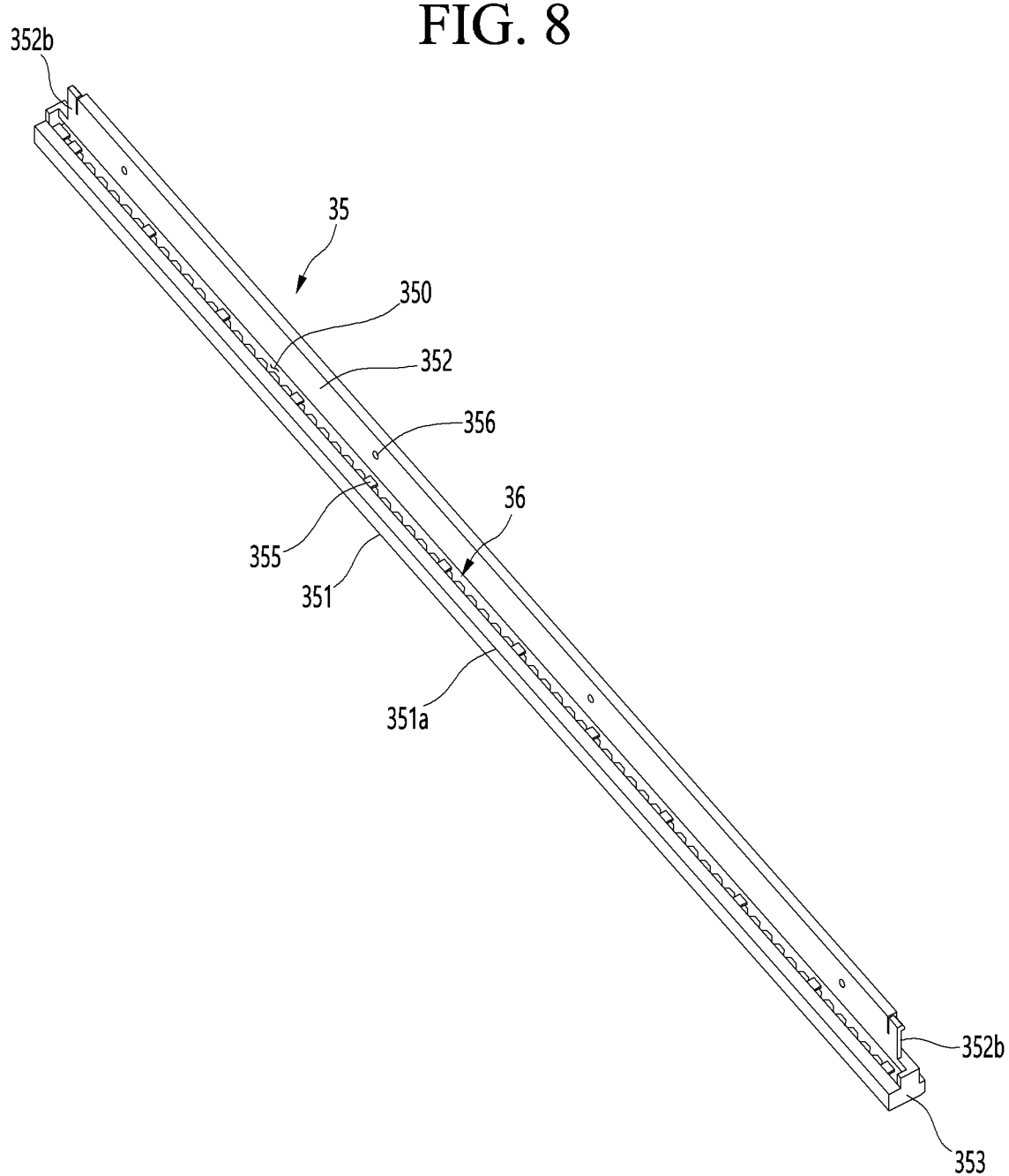
FIG. 8 is a perspective view illustrating a state in which the lighting device is mounted on the lower bracket that is one component of the panel assembly.
Figure 9:
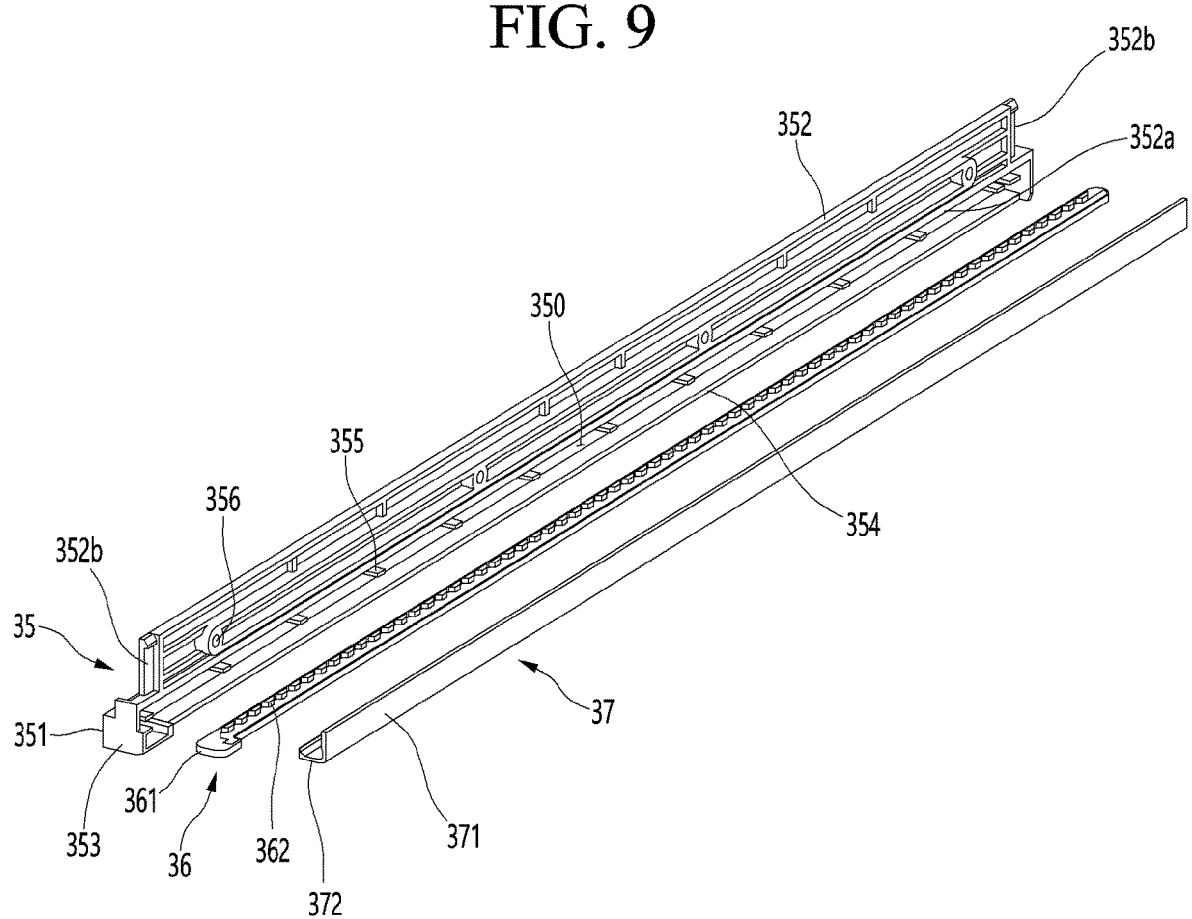
FIG. 9 is an exploded perspective view illustrating the lower bracket, the lighting device, and a heat dissipation member.

FIG. 8 is a perspective view illustrating a state in which the lighting device is mounted on the lower bracket that is one component of the panel assembly. In addition, FIG. 9 is an exploded perspective view of the heat dissipation member that is one component of the panel assembly.

As illustrated in the drawings, the lower bracket 35 may have a corresponding to the right and left direction length of the panel assembly 30. The lower bracket 35 may broadly include the lower bracket front surface portion 351, a lower bracket rear surface portion 352, a lower bracket side surface portion 353, and a lower bracket bottom surface portion 354.

The lower bracket front surface portion 351 may define a shape of the front surface of the lower bracket 35, and a panel support portion 351a may be disposed on the upper end of the lower bracket front surface portion 351 to define the lower end of the panel 31.

That is, the panel support portion 351a may protrude more upward than an upper end of a light source of the lighting device 36 and may protrude to a set height to prevent the lighting device 36 from being exposed forward. The panel support portion 351a may hide an area generated due to intensive light irradiation at the lower end of the light guide plate 33 and the lower end of the panel 31, which are disposed more adjacent to the lighting device 36, to prevent a lighting spot from being formed on the panel 31.

The lower bracket side surface portion 353 may form a side surface of the lower bracket 35 and may protrude above the lower bracket front surface portion 351. The upper end of the lower bracket side surface portion 353 may protrude more upward than the panel support portion 351a, and thus, the stepped portion of the lower end of the side surface of the mounting member 32 may be coupled to be engaged with the lower bracket front surface portion 351 and the lower bracket side surface portion 353.

The lower bracket rear surface portion 352 may define a rear surface of the lower bracket 35 and may protrude more upward than the lower bracket front surface portion 351 and the lower bracket side surface portion 353 to support the light guide plate 33 at the rear side and then may be coupled to the back cover 39.

A lower bracket mounting portion 352b that is disposed to be stepped forward may be disposed on each of both left and right ends of the lower bracket rear surface portion 352. The lower bracket mounting portion 352b may be slidably inserted upward from a lower side of the bracket insertion space 325. In addition, one end of the lower bracket mounting portion 352b may be cut off, and an end of the lower bracket mounting portion 352b may be provided in a hook shape so that the lower bracket mounting portion 352b is hooked and restricted inside the bracket insertion space 325 when the lower bracket 35 is mounted.

A lower bracket screw hole 356 to which a plurality of screws 399 are coupled may be defined in the lower bracket rear surface portion 352. The lower bracket screw hole 356 may be defined at a position corresponding to a cover screw hole 397, and when the back cover 39 is mounted, the screw 399 may sequentially pass through the cover screw hole 397 and the lower bracket screw hole 356 and then be coupled.

A bracket opening may be defined in the lower bracket rear surface portion 352. The bracket opening 352a may be defined at a position facing the lower bracket front surface portion 351 and may be defined to be opened in the rear surface of an accommodation space 350 in which the lighting device 36 is mounted. In addition, the lighting device 36 may be accessible through the bracket opening 352a. The bracket opening 352a may be shielded by the back cover 39.

The lower bracket bottom surface portion 354 may define a bottom surface of the lower bracket 35 and may define a bottom surface of the space in which the lighting device 36 is mounted. A light guide plate support portion 355 protruding rearward may be disposed on the lower bracket front surface portion 351. The plurality of light guide plate supports 355 may protrude backward at a constant interval along the lower bracket front surface portion 351.

In this case, the light guide plate support portion 355 may extend to restrain the lighting device 36 at the upper side. The light guide plate support portion 355 and the lower bracket bottom surface portion 354 may restrain the lighting device 36 at the upper and lower sides to restrain upward and downward movement of the lighting device 36. In addition, a top surface of the light guide plate support portion 355 may support a lower end of the light guide plate 33.

The lighting device 36 may be provided within the lower bracket 35. The lighting device 36 may include a substrate 361 and a light source 362. The substrate 361 may be formed in a plate shape to be accommodated within the lower bracket 35 and may extend from one end of the lower bracket 35 to the other end. The plurality of light sources 362 may be arranged at a constant interval on the substrate 361.

The light source 362 may be disposed to emit light toward the lower end of the light guide plate 33. The light source 362 may be disposed to emit light toward the lower end of the light guide plate 33. The left side end and the right side end of the substrate 361 may be in contact with the lower bracket side surface portion 353 within the lower bracket 35 and may restrain right and left movement.

An example of the light source 362 may include an LED. The light source 362 may include an RGB LED for emitting light with various colors under control of the controller 13. That is, the light source 362 may emit light with various colors under control of the controller 13, and thus the panel 31 may shine with color set by the controller 13. According to color of the panel 31, a color of the outer appearance of the front surface of the refrigerator 1 may be determined.

The light source 362 may include an LED emitting light with specific color other than the RGB LED and may include a combination of a plurality of LEDs emitting light with different colors.

The light sources 362 may be mounted at a constant interval on the substrate 361 and an appropriate number of light sources 362 may be arranged to cause the panel 31 to shine with set brightness. For example, the light sources 362 may be arranged at an interval of 6.3 mm to 7.0 mm, brightness thereof may reach a target brightness of the panel 31, and an entire surface of the panel 31 may shine with uniform brightness equal to or greater than 80%. An interval between the light sources 362 may be less than the right and left width of the light guide plate support portion 355, and thus the light guide plate support portion 355 may be disposed between the light sources 362.

A light supporter 37 may be provided within the lower bracket 35. The light supporter 37 may support the lighting device 36 within the lower bracket 35.

In addition, the light supporter 37 may be made of a metal material to dissipate heat generated by the lighting device 36 by conduction and may be provided in a size that is enough to be accessible through the bracket opening 352a.

The light supporter 37 may include a first supporting portion 372 supporting the lighting device 36 and a second supporting portion 371 that is in contact with the back cover 39. The first supporting portion 372 may be disposed on the lower bracket bottom surface portion 354 within the lower bracket 35. The second supporting portion 371 may extend upward from a rear end of the first supporting portion 372 and be exposed backward through the bracket opening 352a so that when the back cover 39 is mounted, the second supporting portion 371 is in contact with the back cover 39. Thus, the heat generated by the lighting device 36 may be transferred to the back cover 39 through the light supporter 37 so as to be dissipated.

Figure 10:
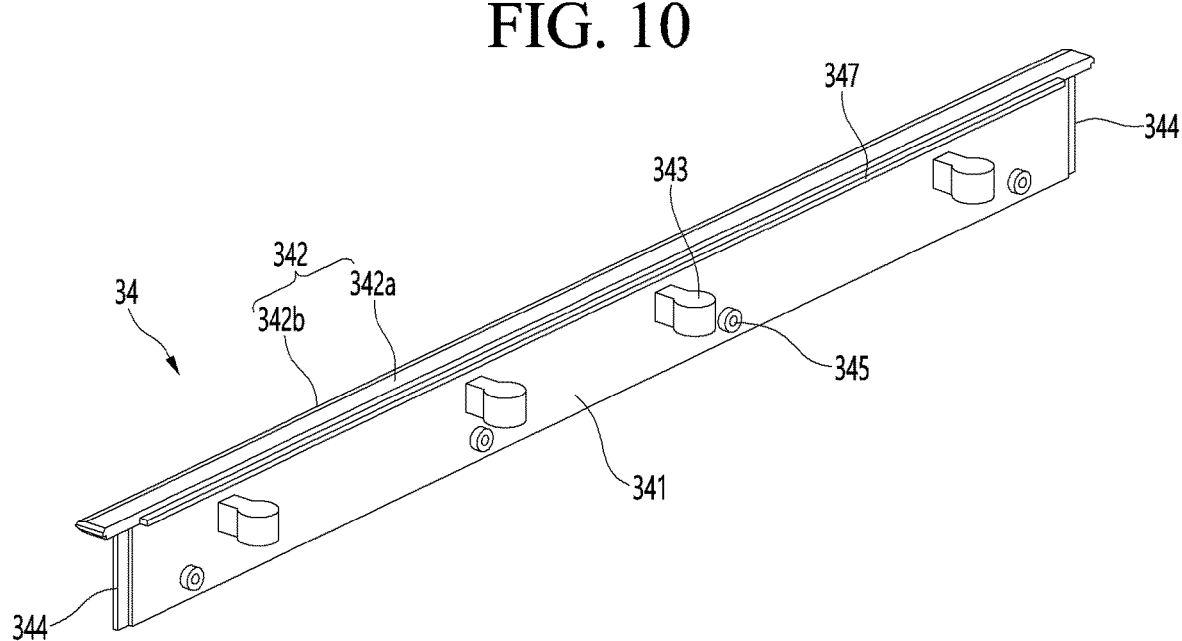
FIG. 10 is a rear perspective view illustrating the upper bracket that is one component of the panel assembly.
Figure 11:
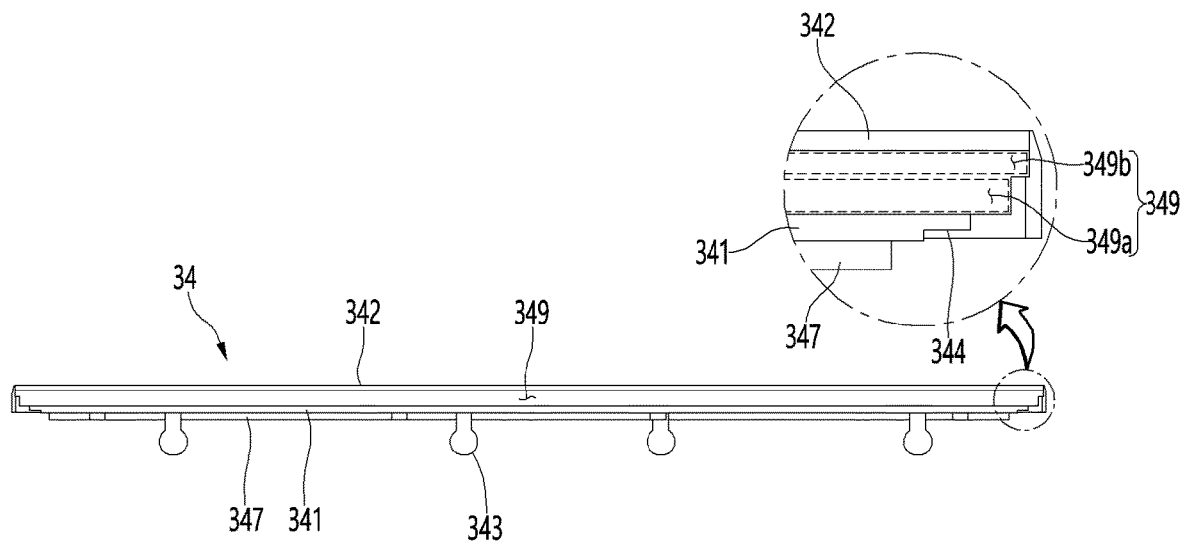
FIG. 11 is a bottom view illustrating the upper bracket.
Figure 12:
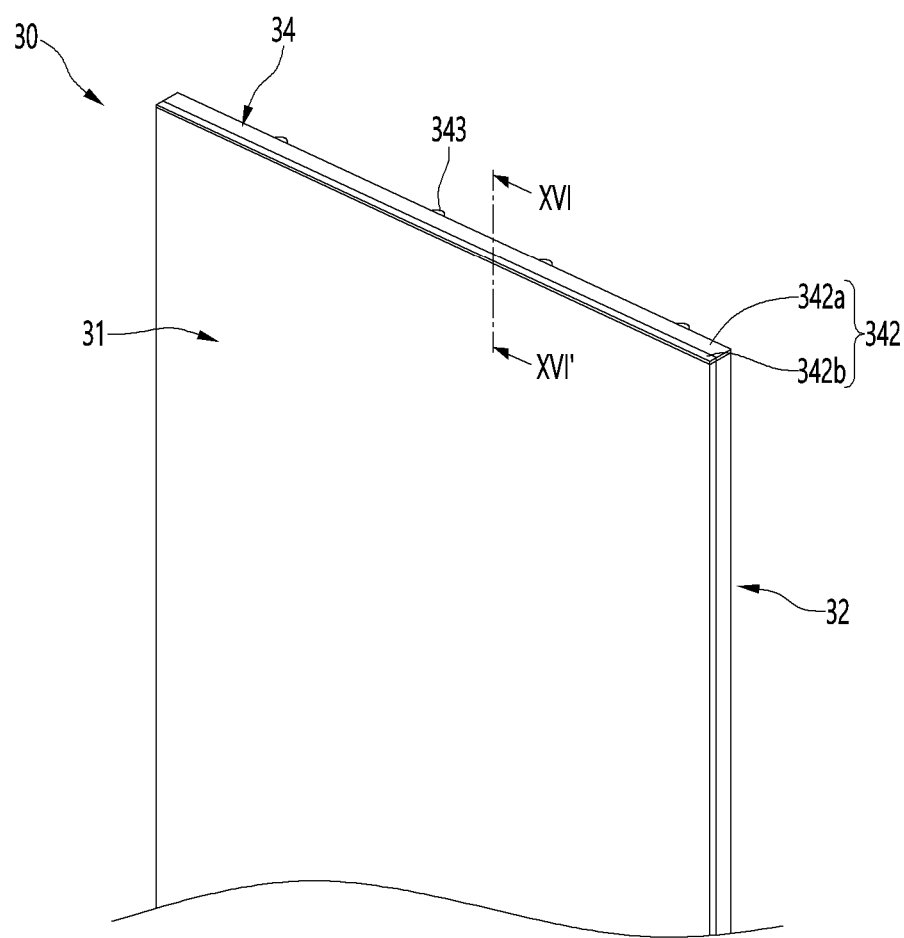
FIG. 12 is a partial enlarged perspective view illustrating an upper portion of the panel assembly.
Figure 13:
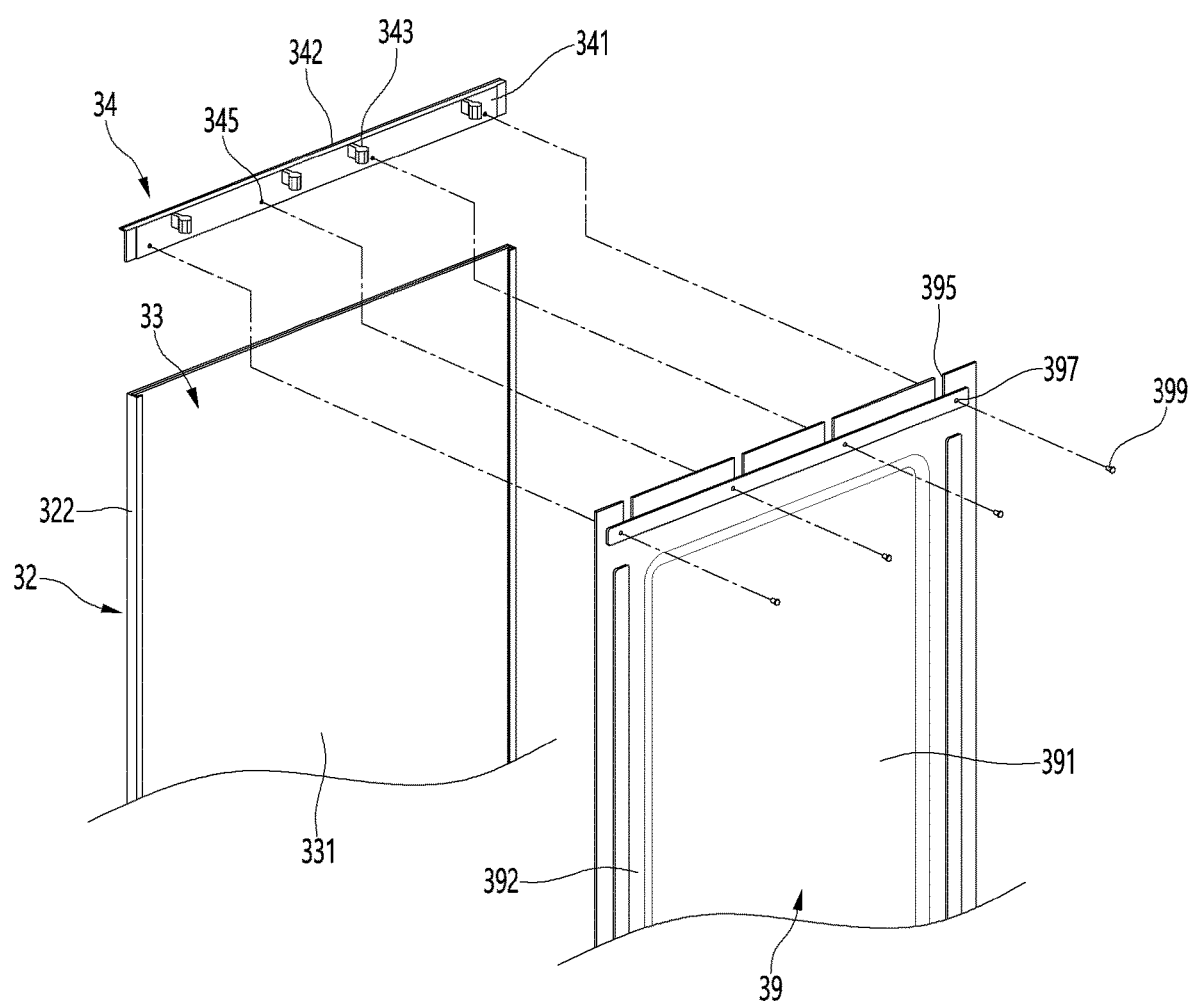
FIG. 13 is an exploded rear perspective view illustrating a state in which a back cover that is one component of the panel assembly and the upper bracket are separated from each other.

FIG. 10 is a rear perspective view illustrating the upper bracket that is one component of the panel assembly. Also, FIG. 11 is a bottom view illustrating the upper bracket. Also, FIG. 12 is a partial enlarged perspective view illustrating an upper portion of the panel assembly. Also, FIG. 13 is an exploded rear perspective view illustrating a state in which the back cover that is one component of the panel assembly and the upper bracket are separated from each other.

As illustrated in the drawings, the upper bracket 34 may have a length corresponding to a length of the panel assembly 30 in a right and left direction. In addition, the upper bracket 34 may define a top surface of the panel assembly 30 in a state of being mounted on the mounting member 32.

In addition, the upper bracket 34 may include an upper bracket extension portion 341 and an upper bracket top surface portion 342 as a whole.

The upper bracket extension portion 341 may be configured to the upper bracket 34 may be disposed in parallel with the panel 31 and the light guide plate 33 to extend in the vertical direction.

In addition, an upper bracket mounting portion 344 disposed to be stepped forward may be disposed on each of both left and right ends of the upper bracket extension portion 341. The upper bracket mounting portion 344 may be disposed to be stepped with respect to the upper bracket extension portion 341 and be disposed in front of the upper bracket extension portion 341.

The upper bracket mounting portion 344 may have a thickness corresponding to a width of the bracket insertion space 325 and may be slidably inserted upward from a lower portion of the bracket insertion space 325.

In the state in which the upper bracket 34 is mounted on the mounting member 32, the upper bracket mounting portion 344 may be fixed in the bracket insertion space 325, and the remaining upper bracket extension portion 341 may be exposed between both the side surface portions 322 to support the upper end of the back cover 39 and to be coupled to the upper end of the back cover 39.

An upper protrusion 343 protruding backward may be disposed on a rear surface of the upper bracket extension portion 341. The upper protrusion 343 may be configured to mount the panel assembly 30 and may protrude from the upper bracket extension portion 341 by a predetermined length to be coupled to an upper mounting portion 431 of the upper cap decoration 43.

In addition, the upper protrusion 343 may protrude from an upper end of the rear surface of the upper bracket extension portion 341 and be provided in plurality at regular intervals along the upper bracket 34. In addition, the upper protrusion 343 may protrude to pass through the protrusion opening 395 of the back cover 39 when the back cover 39 is mounted.

An upper bracket screw hole 345 to be coupled to the screw 399 may be defined in the upper bracket extension portion 341. The upper bracket screw hole 345 may be defined at a position corresponding to the cover screw hole 397. Thus, when the back cover 39 is mounted, the screws 399 may be coupled to sequentially pass through the cover screw hole 397 and the upper bracket screw hole 345.

A cover supporter 347 protruding backward may be disposed on the upper end of the rear surface of the upper bracket extension portion 341. The cover supporter 347 may be in contact with the upper end of the back cover 39 when the back cover 39 is mounted, so that the back cover 39 is maintained at an accurate mounting position.

The upper bracket top surface portion 342 may be disposed on an upper end of the upper bracket extension portion 341. The upper bracket top surface portion 342 may define the top surface of the panel assembly 30 and may extend in a direction perpendicular to the upper bracket extension portion 341.

In detail, the upper bracket top surface portion 342 may extend forward from the upper end of the upper bracket extension portion 341. The front end of the upper bracket top surface portion 342 may extend to shield at least a portion of the upper end of the panel 31 and be disposed to completely shield upper ends of the mounting member 32 and the light guide plate 33.

Thus, the upper bracket 34 may be fixedly coupled to the upper end of the mounting member 32 and be in the state of being fixed to the back cover 39 by the screw 399 to restrain upward movement of the light guide plate 33 and define a shape of the top surface of the panel assembly 30.

The upper bracket top surface portion 342 may include a horizontal portion 342a and an inclined portion 342b. The horizontal portion 342a may extend forward from the upper end of the upper bracket extension portion 341 and be disposed in parallel to the light guide plate 33 and the top surface of the mounting member 32.

In addition, the inclined portion 342b may extend from the front end of the horizontal portion 342a to the front end of the upper bracket top surface portion 342 and have a height that gradually decreases as the inclined portion 342b extends forward. An front end of the inclined portion 342b may be in contact with the upper end of the panel 31 and be shielded so that the upper end of the panel 31 is not exposed.

Due to this structure, when the panel assembly 30 is viewed from the front side, the front end of the upper bracket top surface portion 342 may be minimized to be invisible, and an outer appearance of the panel assembly 30 may be substantially defined by the panel 31.

A groove 349 in which the upper ends of the light guide plate 33 and the mounting member 32 are accommodated may be defined in a bottom surface of the upper bracket top surface portion 342. The groove 349 may be provided in a size and shape that are capable of accommodating the entire upper end of the front surface portion 321 of each of the light guide plate 33 and the mounting member 32.

In detail, the groove 349 may include a light guide plate accommodation portion 349a and a mounting member accommodation portion 349b. The light guide plate accommodation portion 349a may define a space into which the upper end of the light guide plate 33 is inserted and may be recessed to have a size corresponding to a cross-sectional size of the light guide plate 33. In addition, the light guide plate accommodation portion 349a may be defined at a rear end of the groove 349 and be disposed vertically above the light source 362 of the lighting device 36 so that the light irradiated from the light source 362 is directed toward the light guide plate 33.

The mounting member accommodation portion 349b may be disposed in front of the light guide plate accommodation portion 349a and may define a space into which the upper end of the front surface portion 321 of the mounting member 32 is inserted. Thus, the mounting member accommodation portion 349b may be recessed to a size corresponding to the cross-sectional size of the front surface portion 321 and be provided to be longer in the left and right direction than the light guide plate accommodation portion 349a.

The both the left and right ends of the mounting member accommodation portion 349b may protrude further than the light guide plate accommodation portion 349a, and thus, the upper ends of the mounting member 32 and the light guide plate 33 may be accurately mounted at predetermined positions and then may be maintained in position in the mounted state.

In addition, the light guide plate accommodation portion 349a and the mounting member accommodation portion 349b may communicate with each other. Thus, the groove 349 may define a single recessed space, but the recessed inner space may be utilized as the light guide plate accommodation portion 349a and the mounting member accommodation portion 349b.

Therefore, when the upper bracket 34 is mounted on the mounting member 32, the upper end of the light guide plate 33 and the front surface portion 321 may be maintained in the state of being inserted into the groove 349 and be maintained at the accurate mounting position to prevent the light guide plate 33 or the mounting member 32 from moving and being detached.

In addition, in the state in which the upper bracket 34 is mounted, the upper bracket top surface portion 342 may shield the light guide plate 33 and the mounting member 32 at the upper side and simultaneously be in contact with the upper end of the panel 31. Thus, an outer appearance of the top surface of the panel assembly 30 may be defined, and the panel 31 may be protected from an external impact.

In addition, in the state in which the upper bracket 34 is mounted, the upper bracket top surface portion 342 may be seated on the upper end of the side surface portion 322 of the mounting member 32. Here, the upper end of the front surface portion 321 may be inserted into the mounting member accommodation portion 349b, and the upper end of the side surface portion 322 may support both the left and right ends of the upper bracket top surface portion 342 at the lower side.

Hereinafter, a coupling relationship between the upper bracket 34, the light guide plate 33, and the mounting member 32 will be described in more detail with reference to the drawings.

Figure 14:
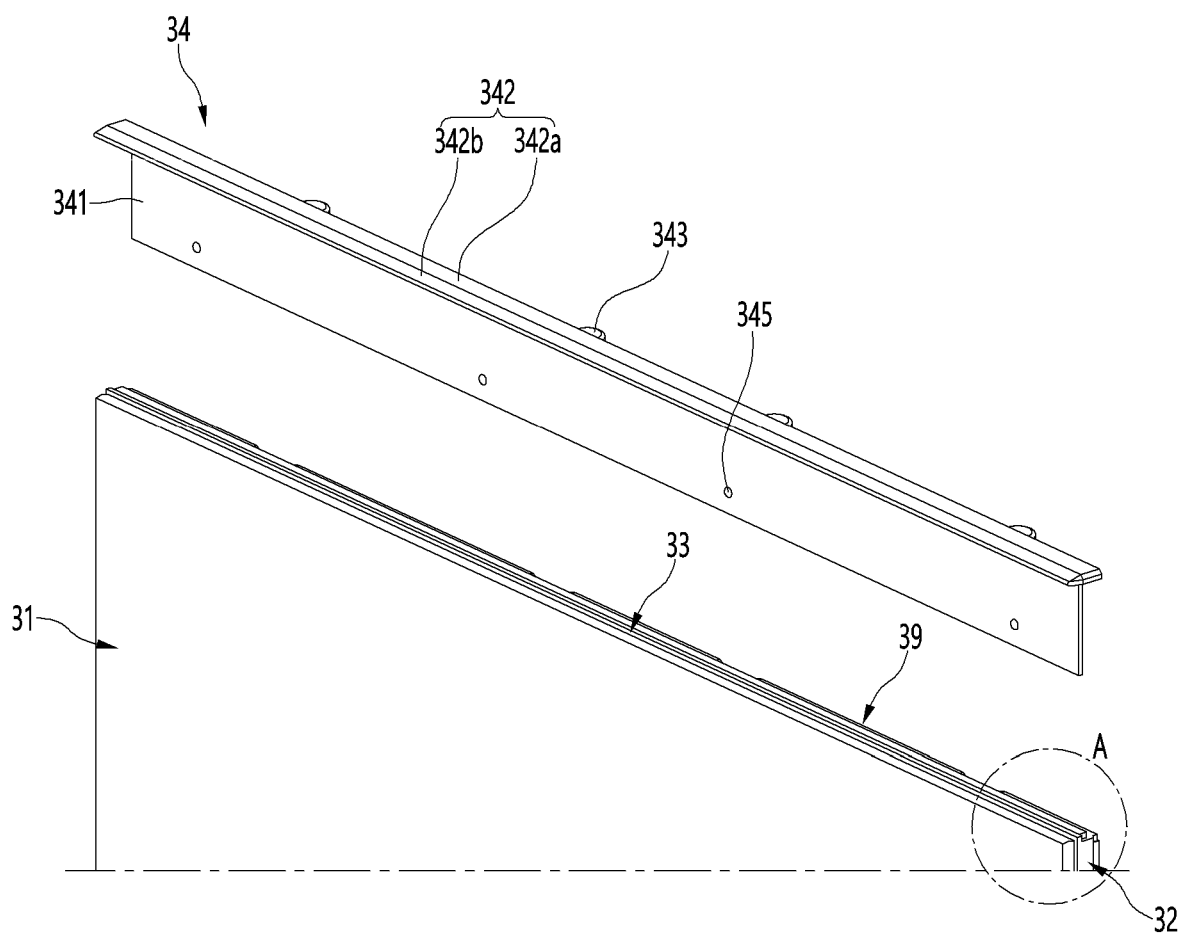
FIG. 14 is an exploded front perspective view illustrating a state in which the upper bracket is separated.
Figure 15:
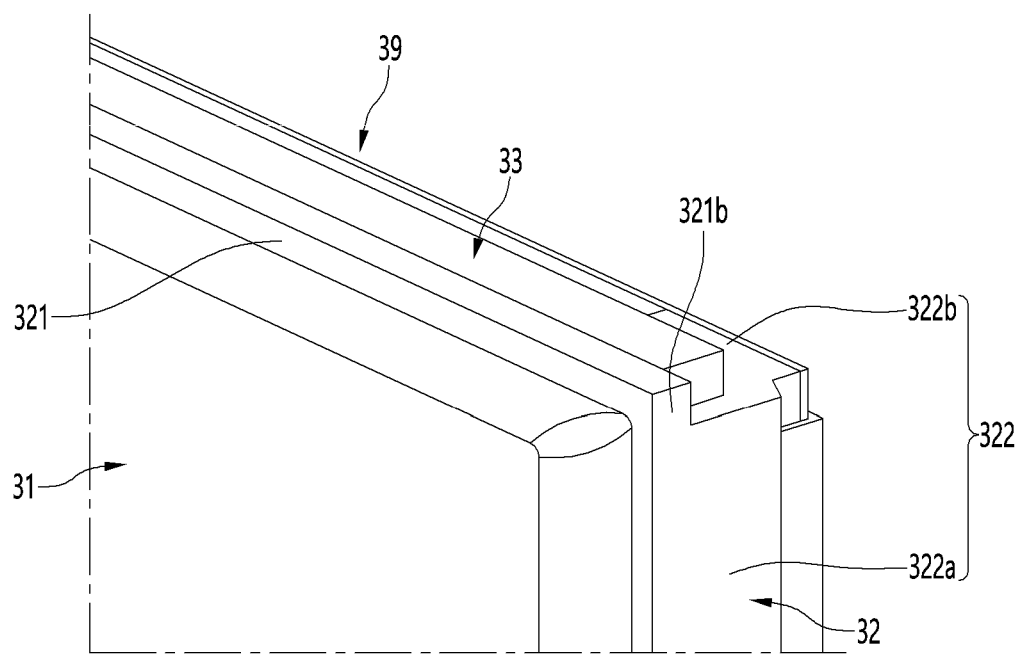
FIG. 15 is an enlarged view illustrating a portion A of FIG. 14.
Figure 16:
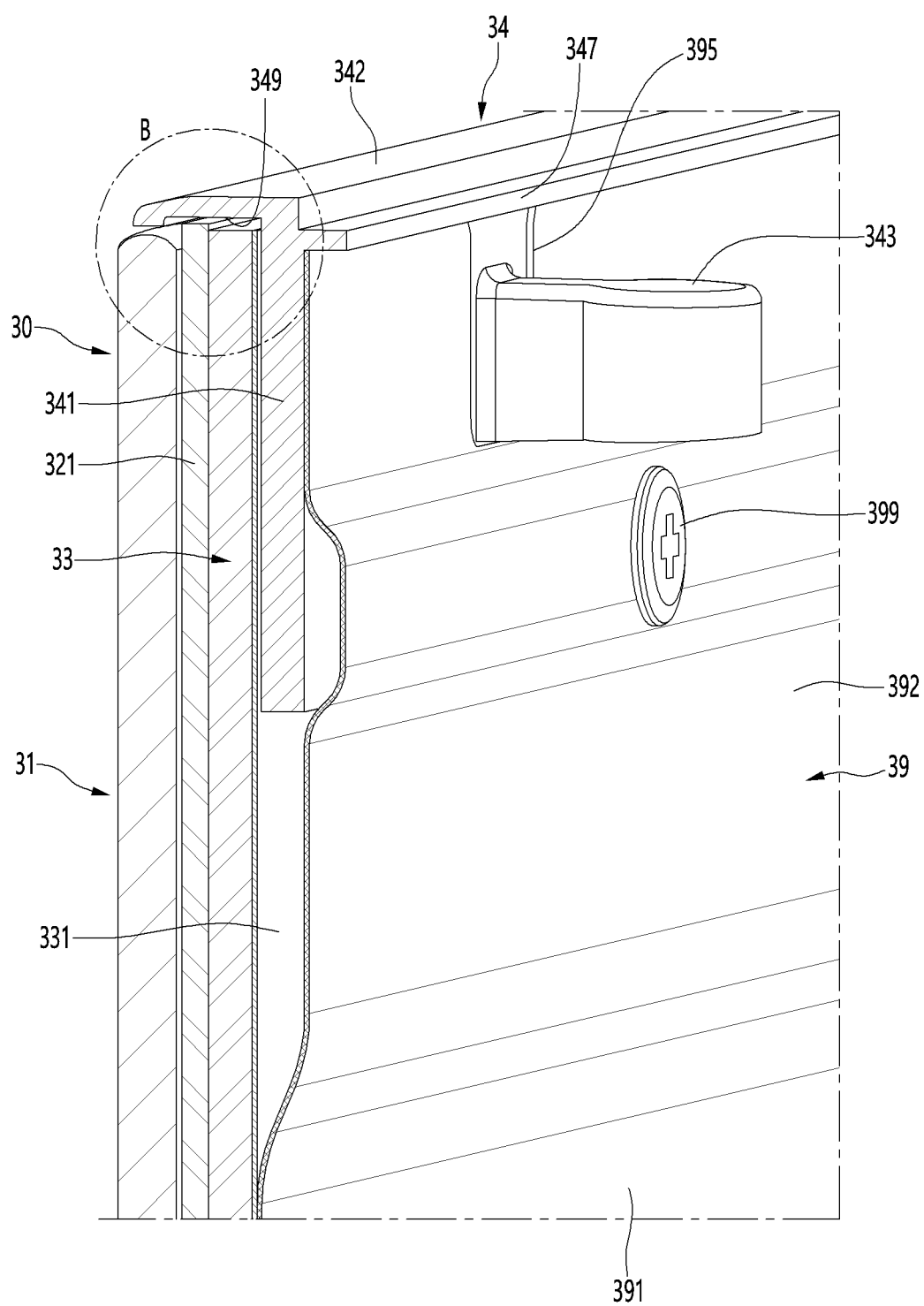
FIG. 16 is a cutaway perspective view taken along line XVI-XVI' of FIG. 12.
Figure 17:
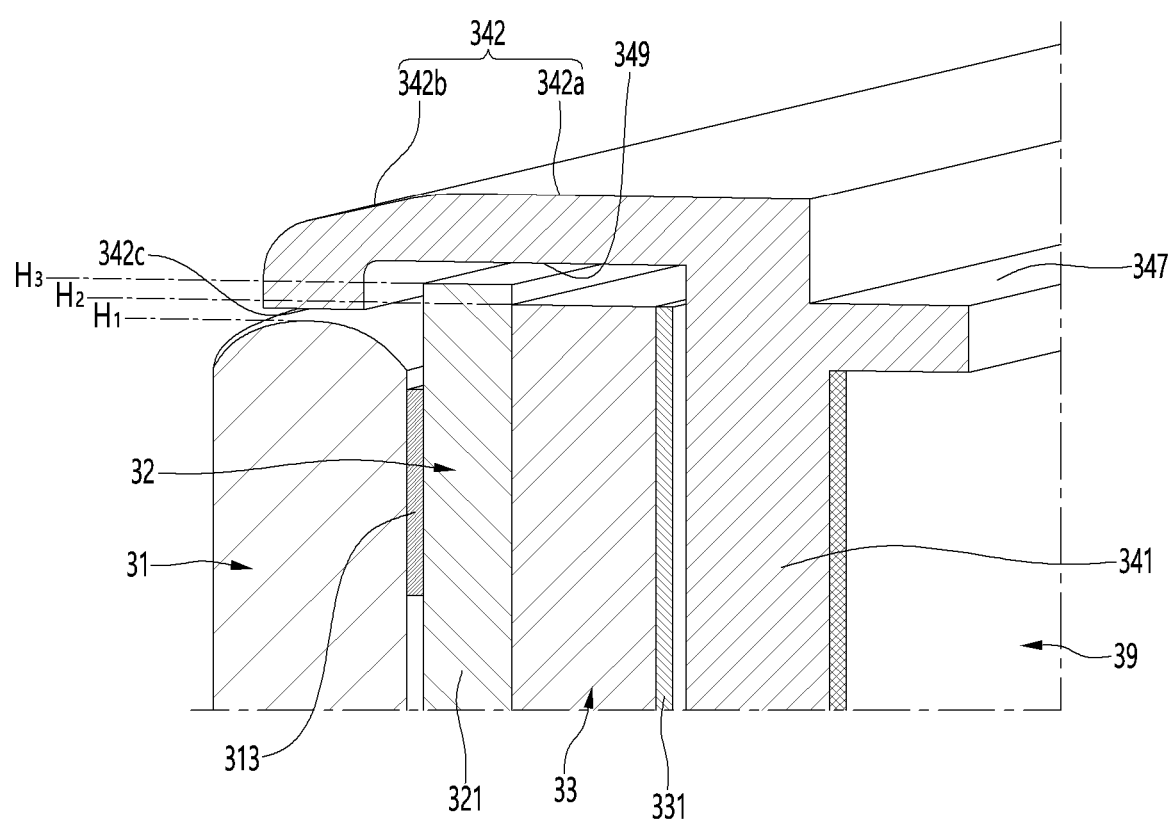
FIG. 17 is an enlarged view illustrating a portion B of FIG. 16.

FIG. 14 is an exploded front perspective view illustrating a state in which the upper bracket is separated. Also, FIG. 15 is an enlarged view illustrating a portion A of FIG. 14. Also, FIG. 16 is a cutaway perspective view taken along line XVI-XVI' of FIG. 12. Also, FIG. 17 is an enlarged view illustrating a portion B of FIG. 16.

As illustrated in the drawings, in the panel assembly 30, the panel 31 may be mounted on the front surface of the mounting member 32, the light guide plate 33 may be slidably inserted into the side surface portion 322, and the upper bracket 34 and the lower bracket 35 may be respectively inserted int the upper and lower ends of the side surface portion 322, and then, the back cover 39 may be coupled to the upper bracket 34 and the lower bracket 35 to define an overall structure of the panel assembly 30.

In this case, each of the front surface portion 321 of the mounting member 32 and the light guide plate 33 may have a size greater than that of the panel 31. In detail, both the left and right ends of the panel 31 and the side surface portion 322 of the mounting member 32 may be disposed on the same plane, and when viewed from the front side, the outer appearance of the front surface of the panel assembly 30 may be defined by the panel 31. In addition, the upper and lower ends of the front surface portion 321 of the mounting member 32 and the upper and lower ends of the light guide plate 33 may protrude more upward and downward than the upper and lower ends of the panel 31.

In addition, the upper bracket 34 and the lower bracket 35 may be mounted to shield the top surfaces of the mounting member 32 and the light guide plate 33. The upper bracket 34 and the lower bracket 35 may further shield the upper and lower ends of the panel 31 and may define outer appearances of the top and bottom surfaces of the panel assembly 30.

In detail, in the state in which the panel 31 is mounted, a height H3 of the upper end of the front surface portion 321 of the mounting member 32 may be greater than a height H1 of the upper end of the panel 31. In addition, a height H2 of the upper end of the light guide plate 33 may be greater than the height H1 of the upper end of the panel 31. Here, the height H2 of the upper end of the mounting member 32 may be greater than the height H2 of the light guide plate 33, but the light guide plate 33 may be expanded and contracted according to a temperature so that the upper end of the light guide plate 33 has a height greater than that of the upper end of the mounting member 32.

The groove 349 may be recessed upward and may be more recessed than the upper end of the mounting member 32 and the upper end of the light guide plate 33. In this case, the recessed inner portion of the groove 349 may be recessed so as not to be in contact the upper end of the light guide plate 33 even when the light guide plate 33 is fully expanded. That is, a recessed depth of the groove 349 may be sufficiently provided to correspond to the expansion of the light guide plate 33.

In addition, a bracket protrusion 342c protruding downward from the front end of the upper bracket top surface portion 342 may be disposed in front of the groove 349. The bracket protrusion 342c may protrude toward the upper end of the panel 31 and may be in contact with the upper end of the panel 31 or protrude up to a position adjacent to the upper end of the panel 31.

In this case, a lower end of the bracket protrusion 342c may be higher than the upper end of the panel 31 and lower than the upper end of the front surface portion 321 of the mounting member 32. Thus, when viewed from the front side, the upper end of the mounting member 32 may not be exposed to the outside, and the upper end of the panel 31 may be shielded to protect the upper end of the panel 31 from an external impact.

Figure 19:
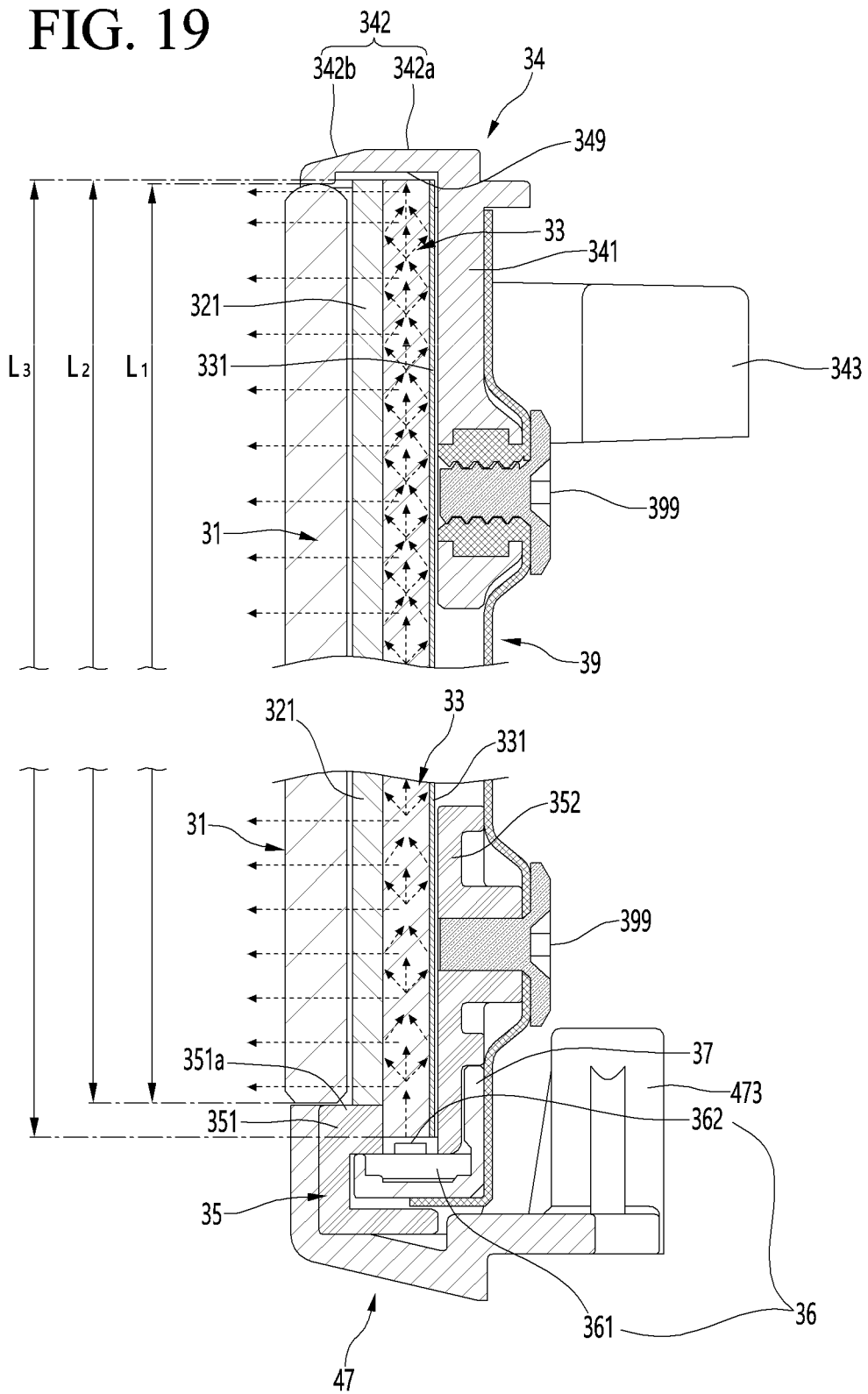
FIG. 19 is a cross-sectional view illustrating an emission state of the panel assembly.

In addition, as illustrated in FIG. 19, the lower end of the front surface portion 321 of the mounting member 32 may be provided at the same or at a position that is slightly lower with respect to the lower end of the panel 31. In addition, the lower end of the light guide plate 33 may protrude more than the lower end of the panel 31 to have a lower height.

Hereinafter, the operations of the refrigerator 1 and the panel assembly 30 having the above structures will be described in more detail with reference to the drawings.

Figure 18:
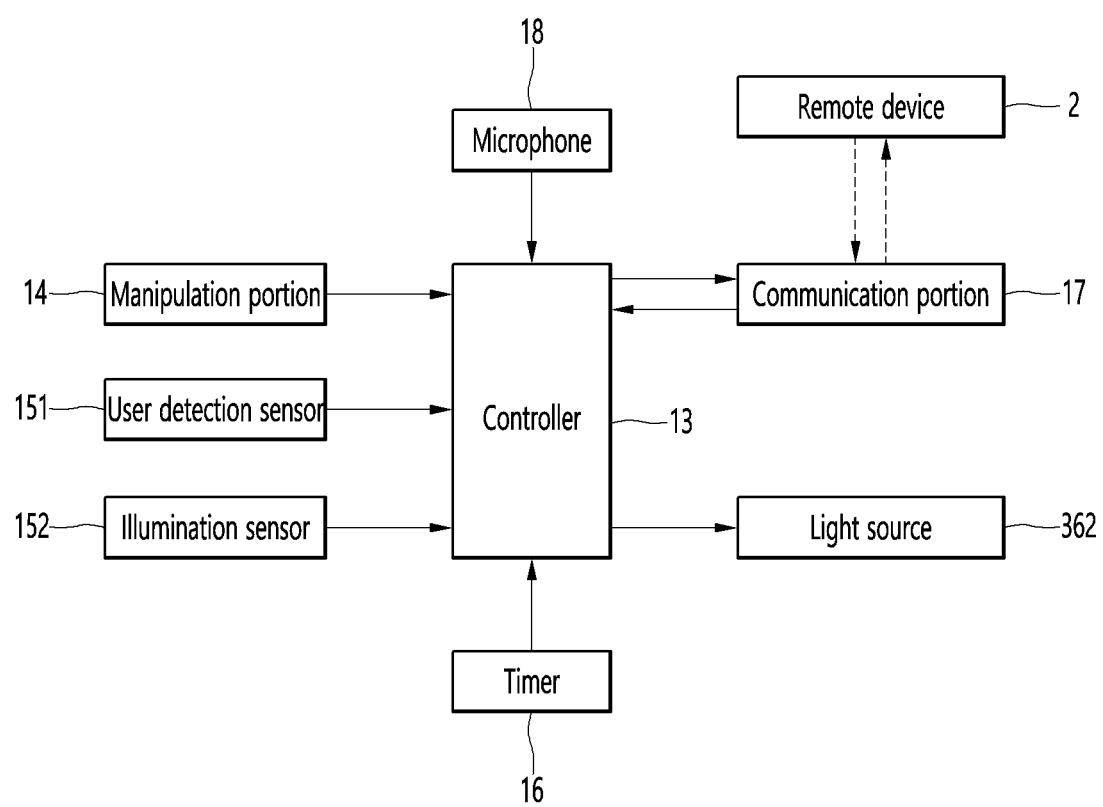
FIG. 18 is a block diagram illustrating a flow of a control signal of the refrigerator.
Figure 20:
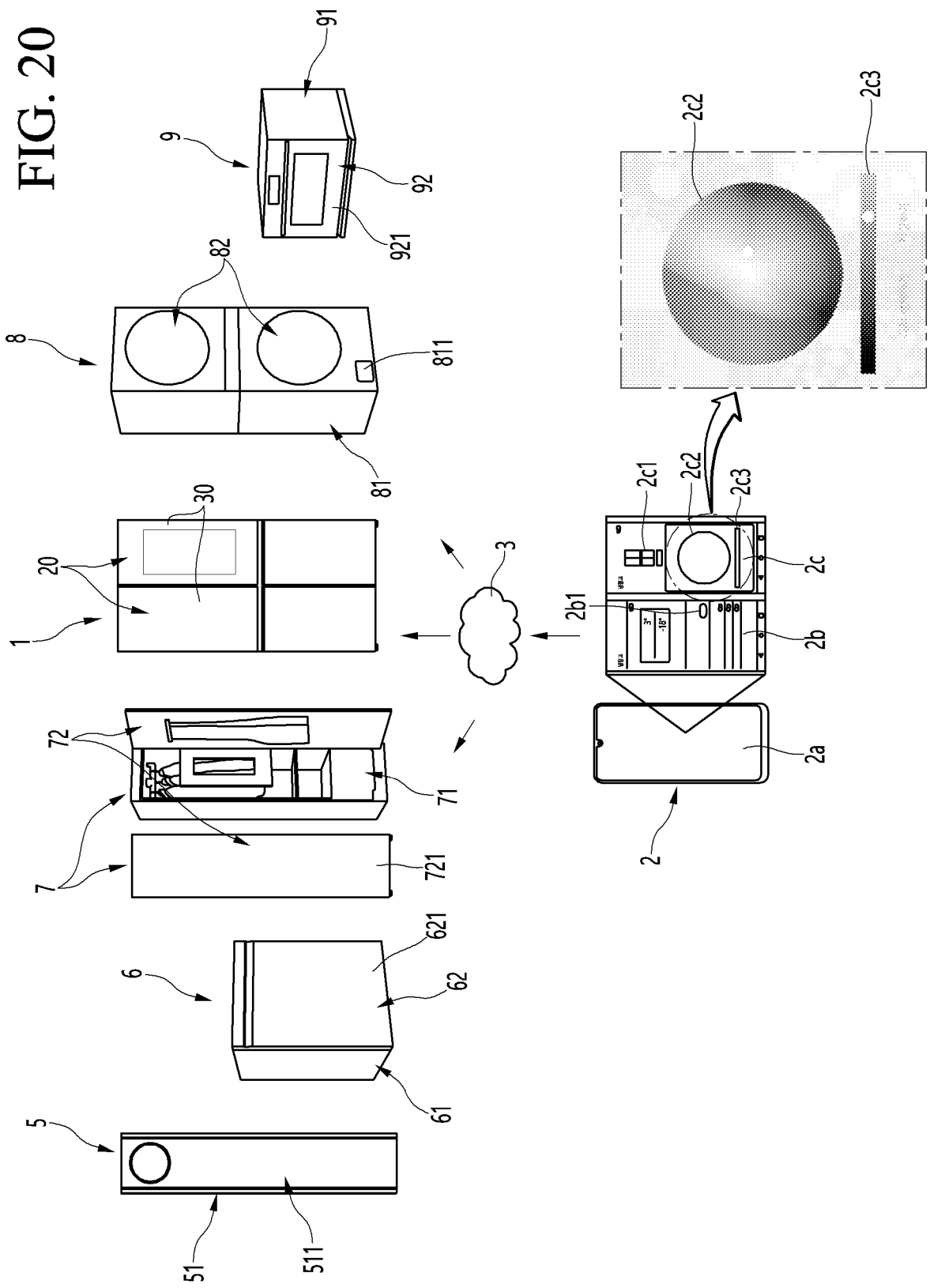
FIG. 20 is a view illustrating an example of adjusting colors of home appliances to which the panel assembly using a remote device is applied.

FIG. 18 is a block diagram illustrating a flow of a control signal of the refrigerator. Also, FIG. 19 is a cross-sectional view illustrating an emission state of the panel assembly. Also, FIG. 20 is a view illustrating an example of adjusting colors of home appliances to which the panel assembly using a remote device is applied.

As illustrated in the drawing, an outer appearance of the refrigerator according to an embodiment may be defined by the panel assembly 30, and also, a color of the outer appearance of the refrigerator may be changed to a color that is set by the user according to the operation of the lighting device 36. The panel assembly may be expressed in various colors by light irradiated from the rear side, and thus the panel assembly 30 or the panel 31 may be referred to as a screen.

The home appliance may be any one of a refrigerator 1, an air conditioner 5, a dishwasher 6, a clothes manager 7, a washing machine 8, or a cooking appliance 9, each of which has a front surface of which a color of an outer appearance is freely changed by applying the same structure as the panel assembly 30 according to an embodiment.

For example, in the above-described embodiment and in the refrigerator 1, the panel assembly 30 may be provided on a front side of the door 20 that opens and closes the cabinet 10. In addition, the panel assembly 30 may shine in a set color by user setting, and the outer appearance of the front surface of the refrigerator 1 may be changed in color.

As another example, an indoor unit of the air conditioner 5 may have a space in which a heat exchange device and a fan are provided inside a case 51 (or cabinet) that defines an outer appearance of the indoor unit. In addition, a front surface of the case 51 may be defined by a panel assembly 511. The panel assembly 511 may have the same structure as the panel assembly 30 of the refrigerator 1 to emit light.

Thus, the panel assembly 511 may shine in a set color by the user setting, and a color of the outer appearance of the front surface of the indoor unit of the air conditioner 5 may be changed into the set color.

As another example, in the dishwasher 6, a space for washing dishes may be defined inside a case 61 or a cabinet that defines an outer appearance of the dishwasher 6. In addition, the front surface of the case 61 may be opened and closed by the door 62, and the front surface of the door 62 may be defined by the panel assembly 621. The panel assembly 621 may have the same structure as the panel assembly 30 of the refrigerator 1 to emit light.

Thus, the panel assembly 621 may shine in a set color by the user setting, and a color of the outer appearance of the front surface of the dishwasher 6 may be changed into the set color.

As another example, in the clothes manager 7, a space for storing clothes may be defined inside a case 71 or a cabinet that defines an outer appearance of the clothes manager 7. In addition, the front surface of the case 71 may be opened and closed by the door 72, and the front surface of the door 72 may be defined by the panel assembly 721. The panel assembly 721 may have the same structure as the panel assembly 30 of the refrigerator 1 to emit light.

Thus, the panel assembly 721 may shine in a set color by the user setting, and a color of the outer appearance of the front surface of the clothes manager 7 may be changed into the set color.

As another example, in the washing machine 8 or a dryer, a space for washing or drying may be defined inside a case 81 (or cabinet) that defines an outer appearance of the washing machine 8. In addition, a front of the case 81 may be opened and closed by the door 82. The front surface of the case 81 may be defined by a panel assembly 811. The panel assembly 811 may have the same structure as the panel assembly 30 of the refrigerator 1 to emit light.

Thus, the panel assembly 30 may shine in a set color by the user setting, and a color of the outer appearance of the front surface of the washing machine 8, the dryer, or the air conditioner 5 may be changed into the set color.

As another example, in the cooking appliance 9, a space for cooking food may be defined inside a case 91 or a cabinet that defines an outer appearance of the cooking appliance. In addition, the front surface of the case 91 may be opened and closed by the door 92, and the front surface of the door 92 may be defined by the panel assembly 921. The panel assembly 921 may have the same structure as the panel assembly 30 of the refrigerator 1 to emit light.

Thus, the panel assembly 921 may shine in a set color by the user setting, and a color of the outer appearance of the front surface of the cooking appliance 9 may be changed into the set color.

A process of changing the color of the panel assembly 30 will be described below.

In a state in which the lighting device 36 is turned off, a color of the outer appearance of the front surface may be expressed by the color of the panel 31. A color displayed on the panel 31 in the state in which the lighting device 36 is turned off may be referred to as a first color.

When the lighting device 36 operates, the color of the panel 31 may be changed according to a color of light irradiated from the lighting device 36, and a color of the outer appearance of the front surface of the door 20 may be expressed in the selected color. In this case, the color of the light irradiated from the lighting device 36 may be referred to as a second color, and the color of the panel that is changed when the lighting device 36 is turned on may be referred to as a third color.

The second color may be different from the third color, and the third color of the panel 31 selected by the user may be implemented by the second color corrected in consideration of the first color of the panel 31 itself. That is, the light having the second color irradiated from the lighting device 36 may be determined by the controller 13 in consideration of the first color of the panel 31 itself, and the light having the second color may pass through the panel having the first color, and thus, the panel 31 may be finally expressed in the third color that is selected by the user.

In detail, the color of the panel 31 may be determined by a selective operation of the lighting device 36. For example, the lighting device 36 may also be manipulated and set through a remote device 2 spaced apart from the refrigerator 1. The refrigerator 1 may communicate with the remote device 2 through a communicator 17 connected to a controller 13, and the user may manipulate an operation of the lighting device 36 through the remote device 2.

The communicator 17 may communicate with the remote device 2 using various methods. The communicator 17 may communicate with the remote device 2 using various methods. The remote device 2 may be various devices that are capable of communicating, such as a dedicated terminal, a mobile phone, a tablet, a portable PC, a desktop PC, a remote control, or a Bluetooth speaker.

The user may manipulate and set the overall operation state of the lighting device 36, such as an operation time and an operation condition of the lighting device 36 and emission color through manipulation of the remote device 2. For example, the lighting device 36 may be simply manipulated and set through an application or a dedicated program installed in a portable phone of the user.

The selection of the color change of the panel 31 through the remote device 2 will be described with reference to FIG. 20. The user may select a desired color of the panel 31 through a screen 2*a* of the remote device 2 such as a mobile phone or a terminal.

When the user manipulates the remote device 2, the remote device first outputs a menu screen 2*b* and manipulates a panel color change menu 2*b*1 through the menu screen 2*b*.

When the user selects the panel color change menu 2*b*1, the remote device 2 may output a color selection screen 2*c* from the menu screen 2*b*, and the user may select a position of the panel 31 to be changed and the color of the panel 31 to be changed on the color selection screen.

In detail, a panel position selection menu 2c1 may be displayed on the color selection screen 2c to select the panel 31 mounted on the door 20 at a desired position among the plurality of doors 20. In addition, the panel 31 of the door 20 selected by the user may be displayed on the panel position selection menu 2c1.

After selecting the desired position of the panel 31, the user may select and input color selection menus 2c2 and 2c3 displayed on the color selection screen 2c. For example, in the color selection menus 2c2 and 2c3, all of the colors to be displayed by the panel 31 may be displayed in the form of a color picker capable of confirming and extracting a color code. The color selection menus 2c2 and 2c3 may be referred to as a palette because combinations and selection of various colors are possible.

The color selection menus 2c2 and 2c3 may include a circular first selection portion 2c2 and a bar-shaped second selection portion 2c3. The first selection portion 2c2 may select a color, and the second selection portion 2c3 may select an intensity of the selected color. The color selection menus 2c2 and 2c3 may include either one of the first selection portion 2c2 or the second selection portion 2c3.

As described above, the user may select the color of the panel 31, i.e., the third color, from among various colors through the color selection menus 2c2 and 2c3. Of course, the color selection menus 2c2 and 2c3 may be configured to be capable of being input in the form of letters, codes, and numbers.

In addition, according to the user's selection of the third color, the controller 13 may control the lighting device 36 to be turned on in the second color so that the panel 31 is displayed in the third color.

In addition, the user may input a color through a manipulation portion 14 provided in the refrigerator 1 without using the remote device 2.

In addition, each of the refrigerator 1 and the remote device 2 may be connected to a server in a network state, and thus, the color of the panel 31 of the refrigerator 1 may be input through the server 3.

The operation of the lighting device 36 may be performed by the manipulation of the manipulation portion 14 by the user. The manipulation portion 14 may be disposed at one side of the refrigerator 1, and for example, may be disposed at one side of the cabinet 10. As necessary, the manipulation portion 14 may be provided in the door 20, or the manipulation may be input by touching and manipulating the panel 31 such as knock. That is, the user may directly manipulate the manipulation portion 14 to set an operation of the lighting device 36 and may turn on or off the lighting device 36.

In addition, the lighting device 36 may also operate by a sensor. The sensor may be, for example, a user detection sensor 151 for detecting proximity of the user. For example, the user detection sensor 151 may use various devices for detecting user approaching near the refrigerator, such as an infrared sensor, an ultrasonic sensor, or a laser sensor.

The sensors 15 may be disposed at various positions for detecting proximity of the user, such as one side of the cabinet or one side of the door 20, and may be disposed at various positions for detecting proximity of the user. A plurality of sensors may be disposed at different positions.

Thus, when the user approaches the refrigerator 1 by a set distance for use of the refrigerator 1, the user detection sensor 151 may detect this and may transfer a signal to the controller 13 to turn on the lighting device 36. When the user moves away from the refrigerator 1, the user detection sensor 151 may detect this and may transfer a signal to the controller 13 to turn off the lighting device 36.

In detail, when the user detection sensor 151 detects that the user is very close to the refrigerator 1, the lighting device 36 may be turned off or the brightness may be gradually dimmed to prevent glare of the user. When the user moves away from the refrigerator 1 again, the lighting device 36 may be turned on again or may return to an original brightness.

The sensor may be an illumination sensor 152. The illumination sensor 152 may detect illumination of an indoor space and may be disposed at the same position as a position at which the user detection sensor 151 is disposed.

The lighting device 36 may be operated according to a detected illumination of the illumination sensor 152. For example, when the detected illumination of the illumination sensor 152 is equal to or less than a set illumination and the lighting device 36 is dimmed, the controller 13 may turn on the lighting device 36, and when the detected illumination of the illumination sensor 152 is equal to or greater than the set illumination and the lighting device 36 becomes brighter, the controller 13 may turn off the lighting device 36.

The sensor may include both the illumination sensor 152 and the user detection sensor 151, and the illumination sensor 152 and the user detection sensor 151 may be operated in a complex way to cause the controller 13 to turn off the lighting device 36.

The controller 13 may be connected to a microphone 18. Thus, the LED 362 may shine with set color according to a voice signal received from the microphone 18, and an input state of the voice signal or a setting state of a function may also be displayed through the front color of the door 20.

For example, when receiving a temperature control signal of the user through the microphone 18, the controller 13 may adjust a set temperature inside the refrigerator, and may operate the lighting device 36 to change color of the front surface of the door 20 to color corresponding to the corresponding temperature.

The lighting device 36 may be turned off at a time set by a timer 16. That is, the lighting device 36 may be turned on according to a time when the user is mainly active and may be maintained off outside the set time range. The lighting device 36 may be turned off during the day and on during night irrespective of actual illumination.

Irrespective of an operation state of the refrigerator 1, the brightness and color of the front surface of the door 20 may be adjusted only according to user settings.

The lighting device 36 may include the state in which brightness is adjusted in addition to an on state and an off state. That is, the controller 13 may control the output of the light irradiated through the lighting device 36 to change brightness of the panel 31. In addition, the operation state of the refrigerator 1 may be indicated through the brightness of the panel 31.

The operation state of the lighting device 36 operating by the controller 13 is now described. As shown in FIG. 19, when the lighting device 36 is turned on according to an instruction of the controller 13, light emitted from the LED 362 may be emitted toward the lower end of the light guide plate 33. In this case, the light emitted from the LED 362 may be irradiated with the second color selected by the controller 13. That is, the LED 362 may be an RGB LED and irradiates the light having the second color corrected by the controller 13 so that the surface of the panel 31 may shine in the third color selected by the user.

The light incident through the lower end of the light guide plate 33 may be diffused and reflected along the light guide plate 33 and then may move along the light guide plate 33. In this case, the light guided by the light guide plate 33 may be reflected forward by the reflective layer 331 to pass through the panel 31 so as to be transmitted to the outside.

Light directed forward through the light guide plate 33 may pass through the mounting member 32 to illuminate the panel 31, and the front surface of the door 20 may shine with a set brightness or color.

Here, the light guide plate 33 may irradiate light having sufficient brightness from the entire surface forward by the LED 362 disposed at each of both ends of an LED mounting portion 361*a*, and thus, the whole including both the ends of the panel 31 may shine with uniform brightness.

The lighting device 36 may be disposed at the lower end of the panel assembly 30 and may be fixed so as not to move inside the lower bracket 35. In addition, the light guide plate 33 is maintained in a fixed state by the mounting member 32. Thus, the light source 362 of the lighting device 36 and the lower end of the light guide plate 33 facing the light source 362 may be maintained to be aligned with each other to effectively irradiate the light of the light source 362 to the light guide plate 33.

Particularly, even when the door 20 is repeatedly opened and closed, the lighting device 36 and the light guide plate 33 may be maintained at accurate positions, and the panel 31 may be secured to shine with a set brightness.

In particular, the light guide plate 33 may be supported from below by its own weight, and thus the set interval G may be maintained between the lower end of the light guide plate 33 and the upper end of the light source 362. Thus, the light emitted from the light source 362 may be effectively incident on the lower end of the light guide plate 33, and the brightness of the panel 31 may be ensured and the panel 31 may shine with uniform brightness.

The lighting device 36 may be disposed below the upper end of the lower bracket bottom surface portion 354. Thus, viewed from the front, the lighting device 36 may be prevented from being exposed, and a lighting spot (a hot spot) may be prevented from being disposed adjacent to the light source 362, thereby improving the quality of an outer appearance of the front surface of the door 20 and preventing glare of the user.

A vertical length L3 of the light guide plate may be greater than a vertical length L1 of the panel. In addition, a vertical length L2 of the mounting member may also be greater than the vertical length L1 of the panel. The vertical length L2 of the mounting member may be the same as the vertical length L3 of the light guide plate or slightly less than the vertical length L3 of the light guide plate.

In detail, the light guide plate 33 disposed behind the panel 31 may have a size greater than that of the panel 31, and in particular, a size protruding more upward and downward than the upper and lower ends of the panel 31. Thus, the light irradiated from the lighting device 36 and irradiated forward through the light guide plate 33 may be evenly irradiated to the upper and lower ends of the panel 31. That is, an entire area including the upper and lower ends of the panel 31 may be brightly illuminated, and no shading may occur on the upper and lower ends of the panel 31.

In addition, the mounting member 32 may also have a size greater than that of the panel 31, and thus, a boundary line of the end of the mounting member 32 may not appear on the panel 31, and the light of the light guide plate 33 may pass through the mounting member 32. Thus, even in the state in which the mounting member 32 is disposed behind the panel 31, the entire surface of the panel 31 may not be shaded due to the components disposed at the rear side, and thus, the entire surface may brightly shine.

Thus, in the state in which the lighting device 36 is turned on, the entire surface of the front surface of the panel assembly 30 including the upper and lower ends may shine with uniform brightness, and the color of the panel 31 may be uniformly expressed on the entire surface.

Hereinafter, a change in outer appearance of the front surface of the door 20 according to the operation of the lighting device 36 will be described with reference to the drawings.

Figure 21:
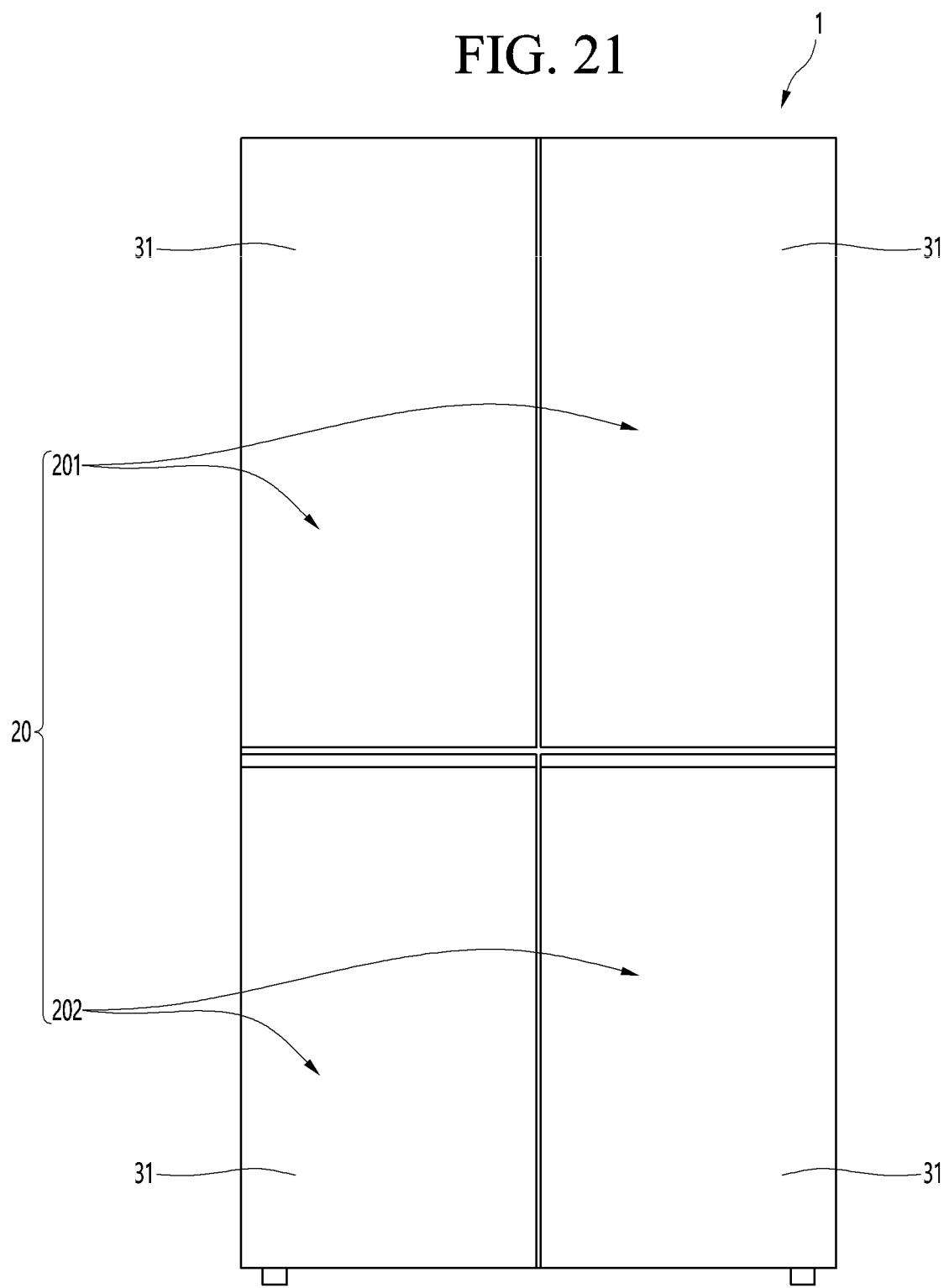
FIG. 21 is a front view illustrating an outer appearance of a front surface of the refrigerator that is in a state in which the lighting device is turned off.
Figure 22:
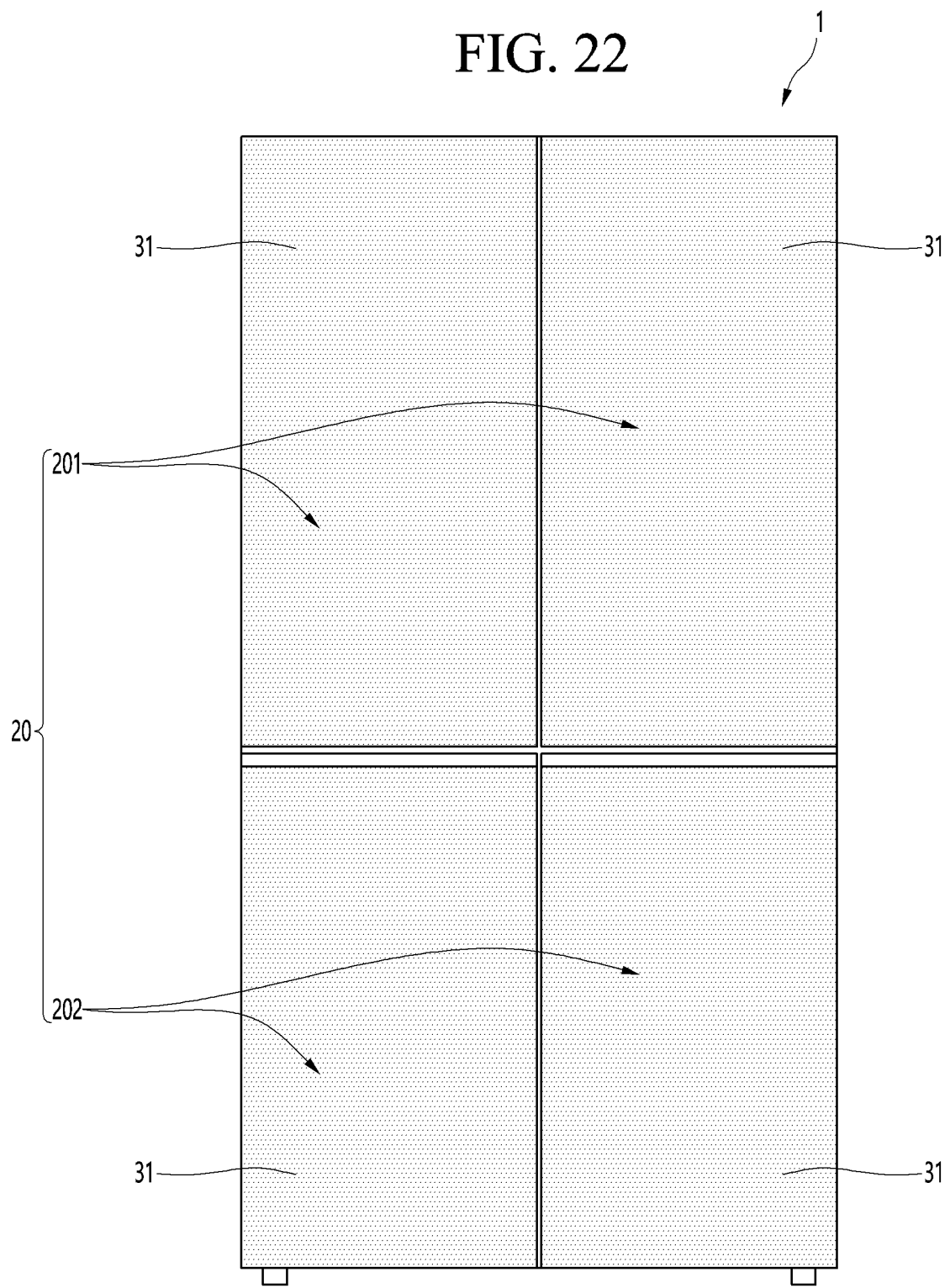
Figure 23:
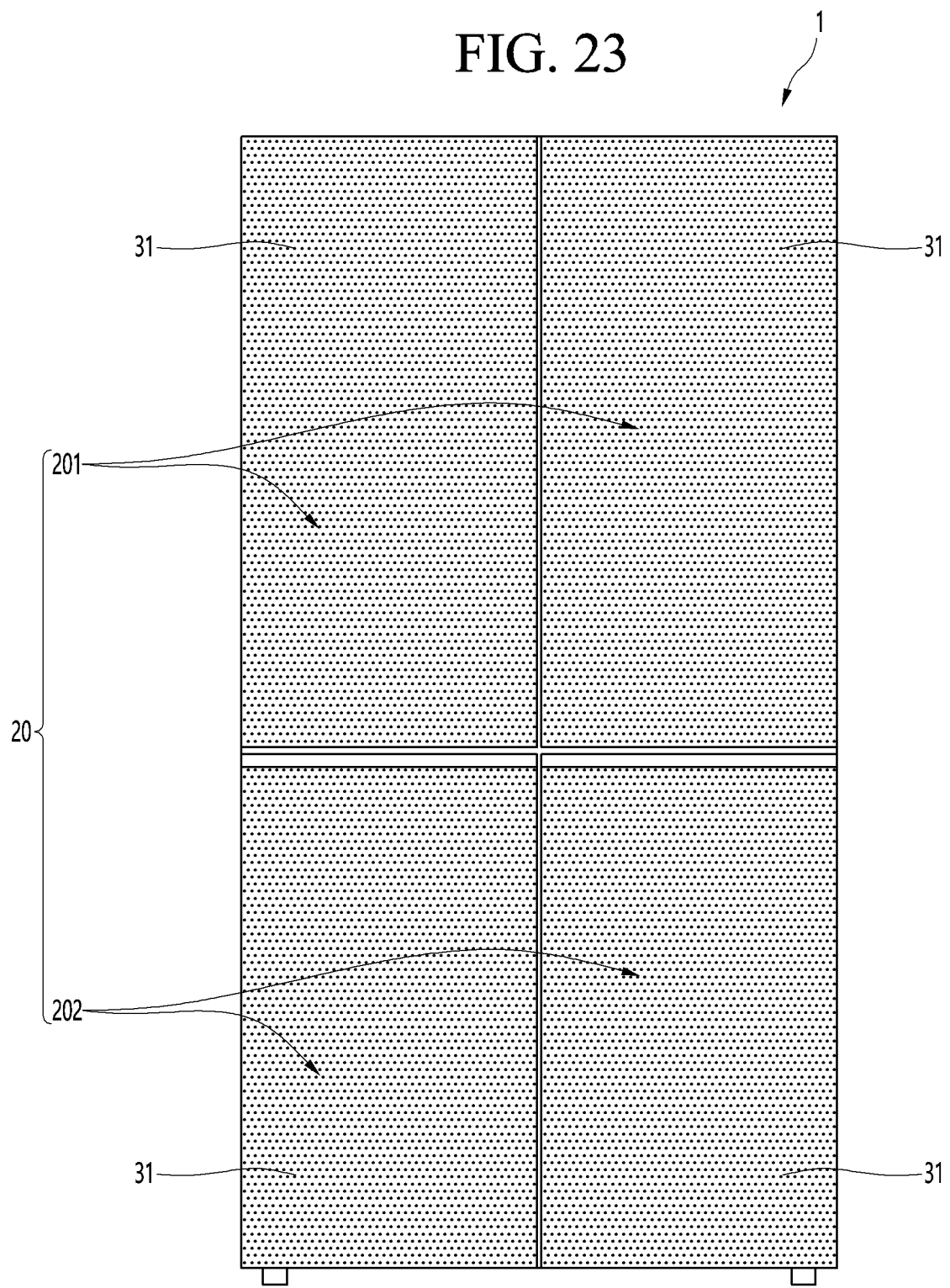
FIG. 23 is a front view illustrating an outer appearance of the front surface of the refrigerator in which the lighting device is changed in color.
Figure 24:
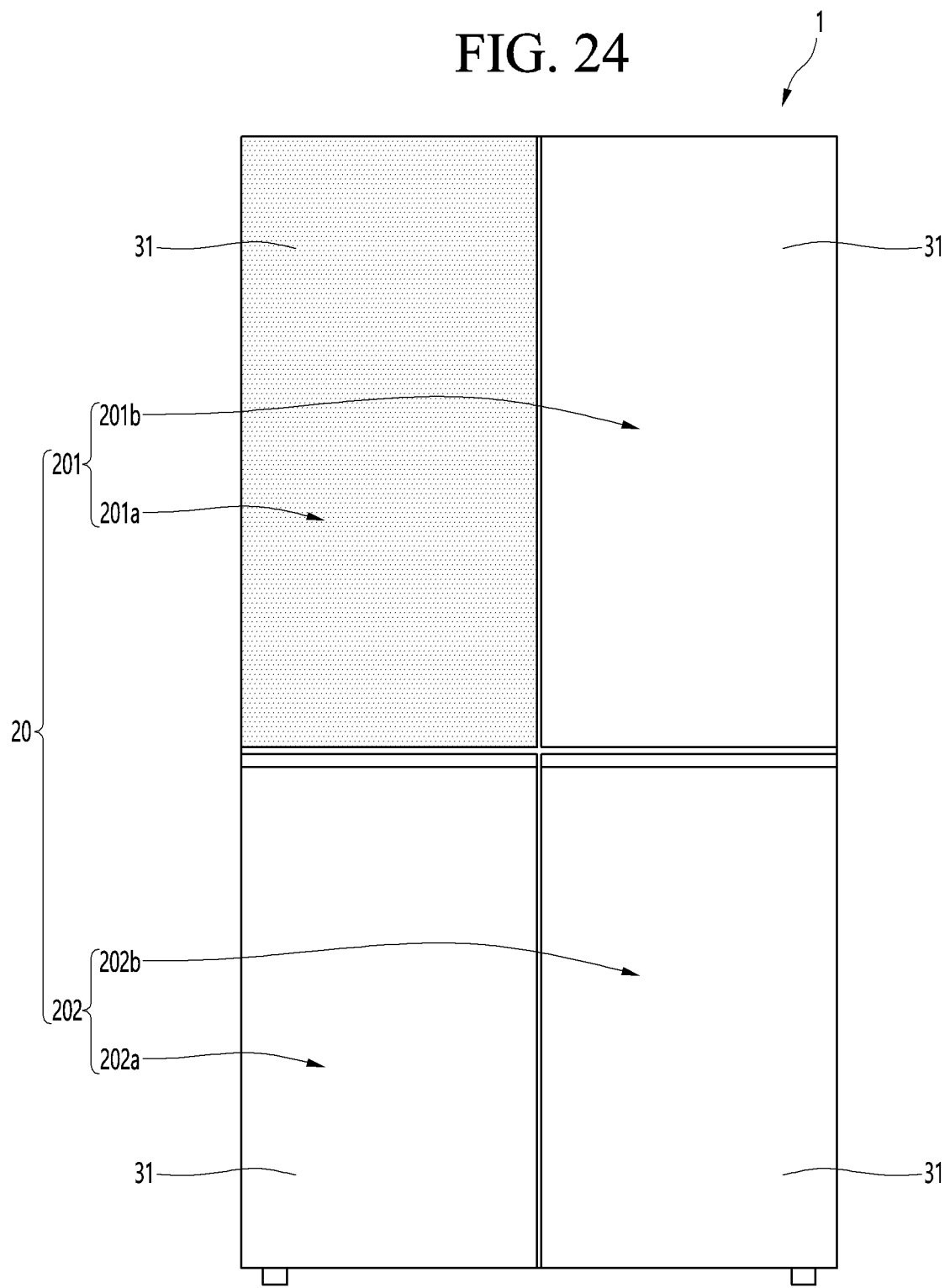
FIG. 24 is a front view illustrating an outer appearance of the front surface of the refrigerator in a state in which a portion of a plurality of doors emits light.
Figure 25:
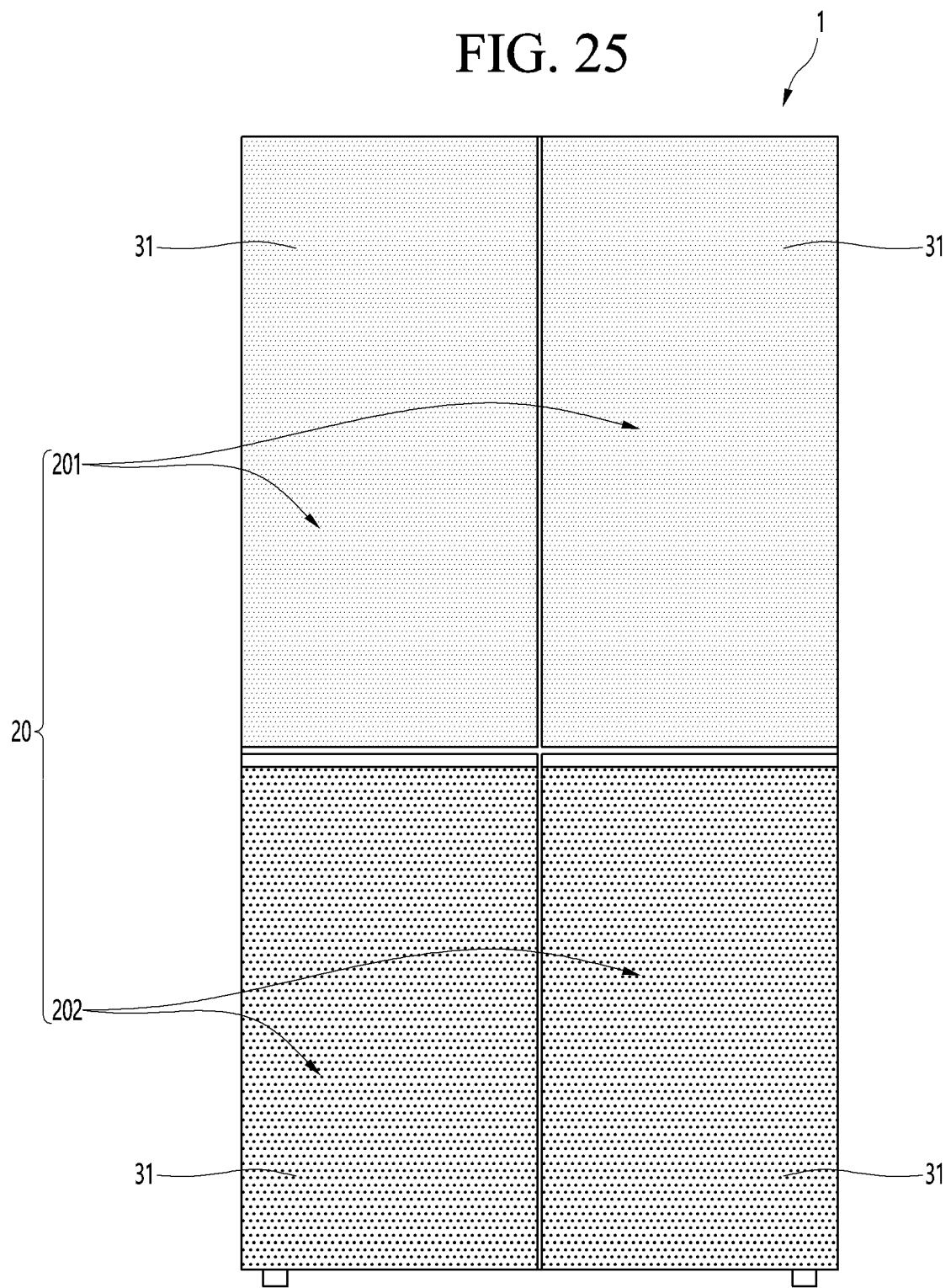
FIG. 25 is a front view illustrating an outer appearance of the front surface of the refrigerator that is in a state in which each of a refrigerating compartment door and a freezing compartment door of the doors emits light.

FIG. 21 is a front view illustrating an outer appearance of a front surface of the refrigerator that is in a state in which the lighting device is turned off. Also, FIG. 22 is a front view illustrating an outer appearance of the front surface of the refrigerator that is in a state in which the lighting device is turned on. Also, FIG. 23 is a front view illustrating an outer appearance of the front surface of the refrigerator in which the lighting device is changed in color. Also, FIG. 24 is a front view illustrating an outer appearance of the front surface of the refrigerator in a state in which a portion of a plurality of doors emits light. Also, FIG. 25 is a front view illustrating an outer appearance of the front surface of the refrigerator that is in a state in which each of a refrigerating compartment door and a freezing compartment door of the doors emits light.

For example, in the state in which the lighting device 36 is turned off, as illustrated in FIG. 21, a front surface of the door 20 may not shine, and an original color of the panel assembly 30 may appear.

The panel assembly 30 may have a structure that is separable from the door body 40, and thus, the user may select a color of the first panel 31 by mounting the panel assembly 30 having a desired color. Of course, if necessary, the user may change the color of the panel 31 when the lighting device 36 is turned off by exchanging the panel assembly 30 itself.

The color of the front surface of the door 20 may be seen as the color of the panel 31, and the texture and pattern provided on the panel 31 may be seen. In this case, the color of the panel 31 may be color with brightness greater than 0 and may be provided in a color other than black.

Thus, the front surface of the door 20 may be seen with the first color that is the color of the panel 31. In this case, components inside the panel assembly 30 may be seen through the panel 31 and may not be seen to the outside by the color of the panel 31.

In this state, the lighting device 36 may be turned on, and when the lighting device 36 is turned on, the front surface of the door 20 may shine with a color set by the user.

For example, as illustrated in FIG. 22, the controller 13 may control the front surface of the door 20 to shine with a second color different from the first color, and the lighting device 36 may cause the LED 362 to shine with the second color according to the control of the controller 13. Here, the third color may be selected by the user, and the color of the panel 31 may be selected by the manipulation of the remote device 2 or the manipulation of the manipulation portion 14.

When the LED 362 shines in the second color, the light reflected by the light guide plate 33 may pass through the front of the panel 31, and the front of the door 20, that is, the panel 31 may be expressed in the third color.

In the state in which the outer appearance of the front surface of the refrigerator 1 shines with the third color, when the controller 13 instructs change in color of the front surface of the refrigerator 1, the front surface of the panel 31 may shine with a color that is reset by the controller 13.

For example, as illustrated in FIG. 23, the controller 13 may instruct change in color of the front surface of the panel 31 to shine with the second color different from the first color, and the lighting device 36 may irradiate light having a color different from that of the LED 362 according to the instruction of the controller 13.

When the LED 362 shines in the different color, the light reflected by the light guide plate 33 may pass through the light through the panel 31, and the front of the door 20, that is, the panel 31 may be expressed in the fourth color.

Some of the plurality of doors 20 forming the outer appearance of the front surface of the refrigerator 1 may emit light, or the panels 31 constituting the plurality of doors 20 may independently emit light to define the outer appearance of the front surface of the refrigerator 1 with the set color.

For example, as illustrated in FIG. 23, the controller 13 may instruct change in color of the front surface of the door 20 to shine with the third color different from the first color and the second color, and the lighting device 36 may irradiate light having the different color through the lighting device 36.

When the light source 362 emits light having the different color, the light reflected by the light guide plate 33 may pass through the panel 31, and the front surface of the door 20, that is, the panel 31 may be expressed in the third color.

Some of the plurality of doors 20 forming the outer appearance of the front surface of the refrigerator 1 may emit light, or the panels 31 constituting the plurality of doors 20 may independently emit light to define the outer appearance of the front surface of the refrigerator 1 with the set color.

For example, as illustrated in FIG. 24, the refrigerator 1 may operate so that some doors 20 of the plurality of doors 20 shine or shine with a specific color. That is, all the lighting devices 36 provided in the doors 20 may not operate, but instead, only some 201a of all the doors 20 may shine. For example, any one door 201a of the refrigerating compartment door 201 may shine. That is, the left refrigerating compartment door 201a among the left refrigerating compartment door 201a and the right refrigerating compartment door 201b may shine. Of course, the door 20 may be any one of the freezing compartment doors 202.

As necessary, the left refrigerating compartment door 201a and the right refrigerating compartment door 201b may shine with a different color. At least two of the doors 20 may be sequentially changed in color and at least two of the doors 20 may be sequentially turned on or off.

The refrigerating compartment door 20 or the freezing compartment door 20 among the doors may be controlled to shine with the different color.

For example, as illustrated in FIG. 25, the controller 13 may control the lighting device 36 so that one pair of refrigerating compartment doors 201 are expressed in the first color. The controller 13 may control the lighting device 36 so that one pair of the refrigerating compartment doors 201 are expressed in a different color.

That is, the refrigerating compartment door 201 and the freezing compartment door 202 may be distinguished therebetween with colors, and according to a temperature change inside the refrigerator, the colors of the refrigerating compartment door 201 and the freezing compartment door 202 may also be changed.

Thus, through the front color of the door 20, the user may intuitively recognize an operation state of each storage space as well as may distinguish between the refrigeration compartment and the freezing compartment.

There may be various other embodiments other than the aforementioned embodiments. According to another embodiment of the present disclosure, the panel assembly may be shield an open front surface of the door body. Another embodiment of the present disclosure may have the same structure as the aforementioned embodiment except for some components of the door body, and thus the same components as in the aforementioned embodiment use the same reference numeral, and a detailed description thereof may be omitted.

Hereinafter, another embodiment of the present disclosure will be described with reference drawings.

Figure 26:
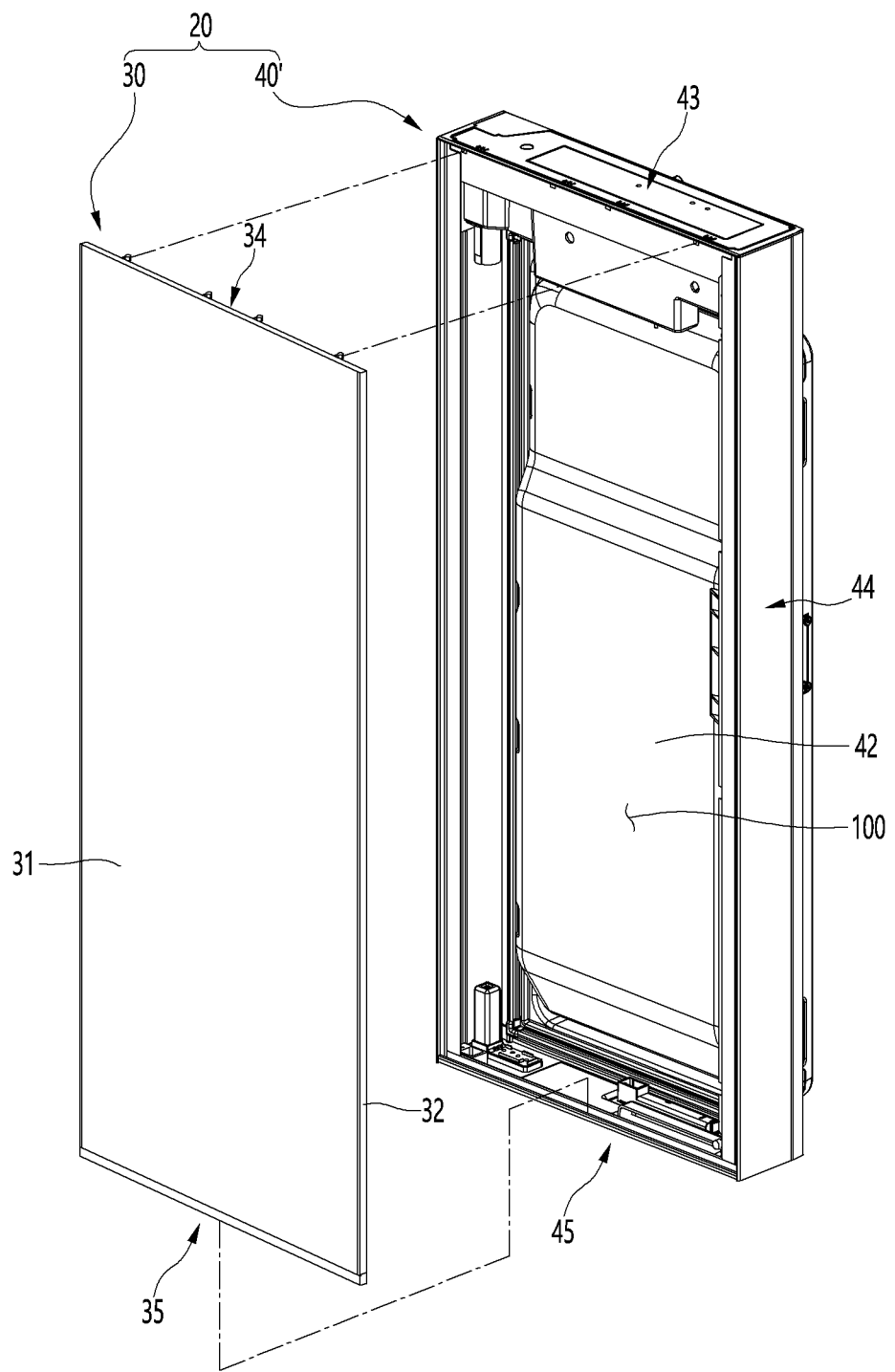
FIG. 26 is an exploded perspective view of a refrigerator door according to another embodiment of the present disclosure.

FIG. 26 is an exploded perspective view of a refrigerator door according to another embodiment of the present disclosure.

As shown in the drawing, the door 20 of the refrigerator according to another embodiment of the present disclosure may include the panel assembly 30 and a door body 40'. The panel assembly 30 may be coupled to the door body 40' to form a front surface of the door 20.

The overall structure of the panel assembly 30 may be the same as the aforementioned embodiment. That is, the panel assembly 30 may include the panel 31, the mounting member 32, the light guide plate 33, the upper bracket 34, the lower bracket 35, the lighting device 36, the light supporter 37, and the back cover 39, which are the same as those of the aforementioned embodiment, and thus a detailed description thereof will be omitted and may refer to the drawings of the aforementioned embodiments.

The door body 40' may include the door liner 42 defining a bottom surface of the door 20, the upper cap decoration 43 disposed on upper and lower ends of the door liner 42, and the side decoration 44 disposed on right and left ends of the door liner 42. The upper cap decoration 43 and the lower cap decoration 45 may form upper and bottom surfaces of the door 20, and the side decoration 44 may form right and left side surfaces of the door 20.

In the state in which the door liner 42, the upper cap decoration 43, the lower cap decoration 45, and the side decoration 44 are coupled to each other, a body inner space 100 with an open front surface may be defined. The body inner space 100 may be shielded by the panel assembly 30.

That is, the panel assembly 30 may be coupled to the upper cap decoration 43, the lower cap decoration 45, and a front end of the side decoration 44, and a space in which an insulator is filled may be defined with the door liner 42 inside the door 20.

In the state in which the panel assembly 30 and the door body 40' are coupled to each other, an insulator may be filled in the door 20, and the insulating capability of the door 20 may be satisfied by filling the insulator in the body inner space 100.

In the state in which the door 20 is completely assembled, a bottom surface of the panel assembly 30, i.e., a rear surface of the back cover 39 may be in contact with the insulator. Thus, the insulator may not penetrate into a space inside the panel assembly 30 and may be protected by the back cover 39. The rear surface of the back cover 39 may be in contact with the insulator, and the panel assembly 30 may be firmly fixed to the door 20.

There may be various other embodiments other than the aforementioned embodiments. According to another embodiment of the present disclosure, the storage space may be partitioned into right and left sides, and the door includes a refrigerating compartment door and a freezing compartment door at right and left sides. Another embodiment of the present disclosure may have the same structure as the aforementioned embodiment except for arrangement of a storage space and a door, and thus the same components as in the aforementioned embodiment use the same reference numeral, and a detailed description thereof may be omitted.

Hereinafter, another embodiment of the present disclosure will be described with reference drawings.

Figure 27:
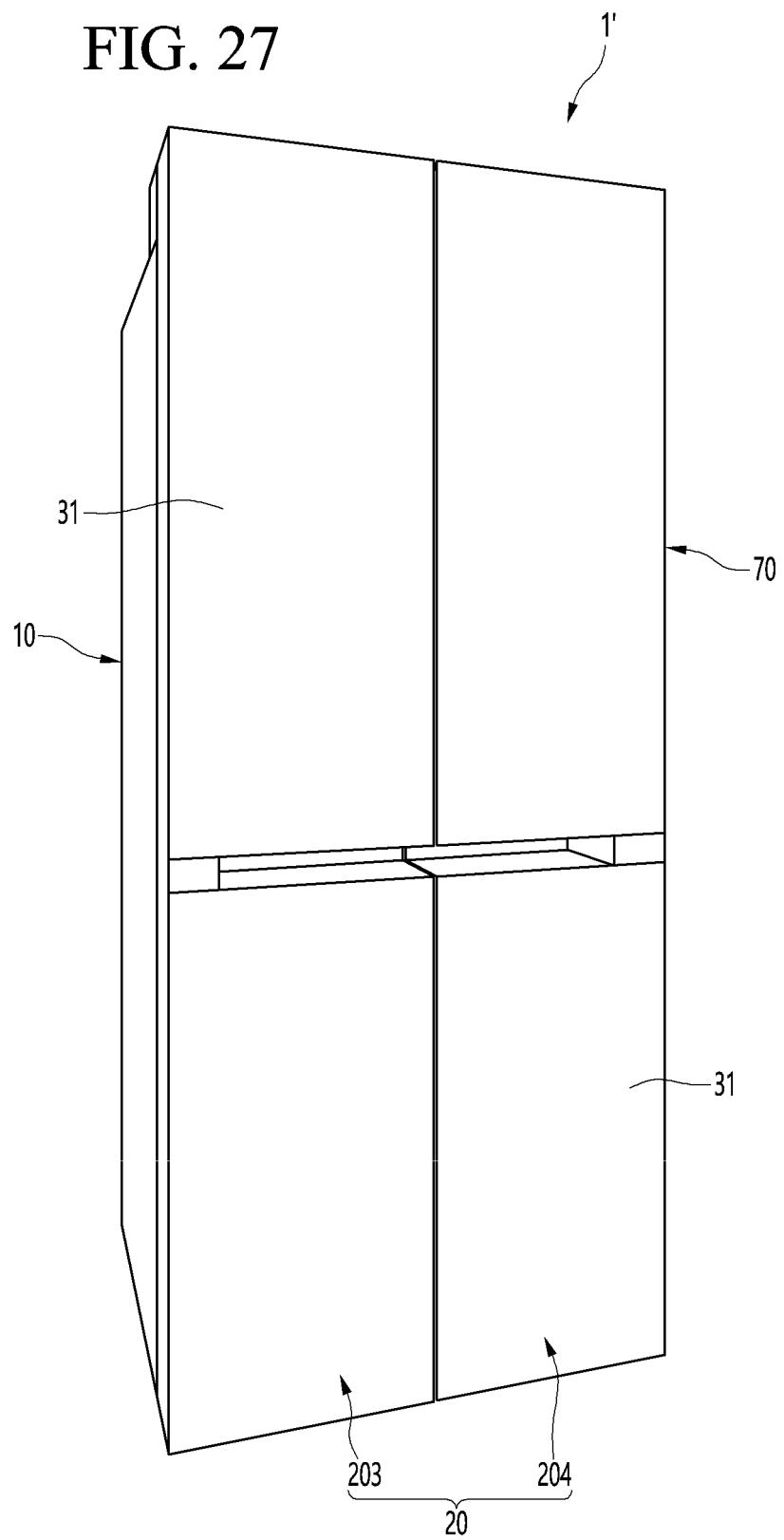
FIG. 27 is a perspective view of a refrigerator according to further another embodiment of the present disclosure.
Figure 28:
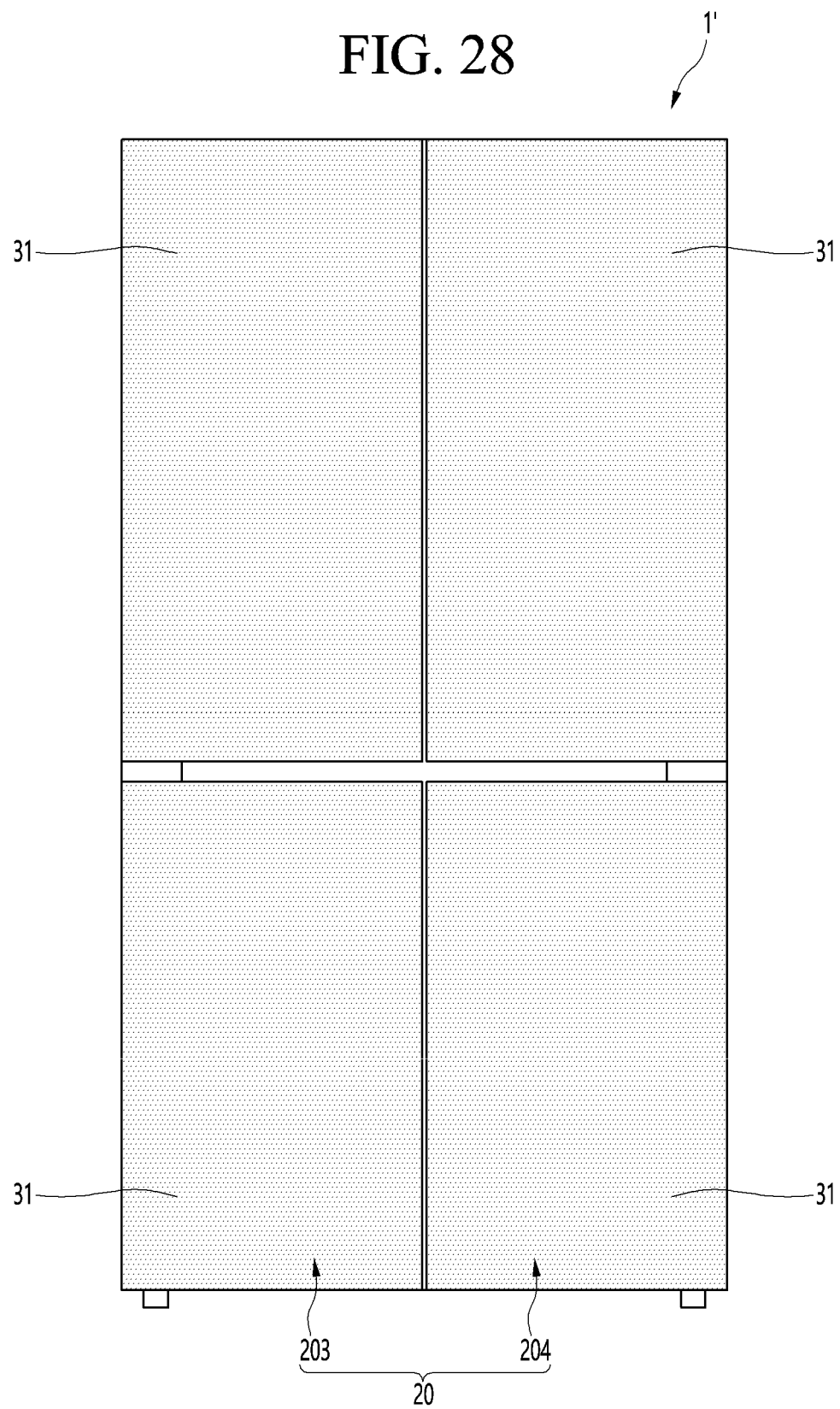

FIG. 27 is a perspective view of a refrigerator according to further another embodiment of the present disclosure. FIG. 28 is a front view of an outer appearance of the front surface of a refrigerator in the state in which a lighting device of the refrigerator is turned on.

As shown in the drawings, an outer appearance of a refrigerator 1' according to another embodiment of the present disclosure may be defined by the cabinet 10 in which a storage space is defined, and the door 20 for opening and closing an open front surface of the cabinet 10.

The cabinet 10 may be divided into right and left sides. Although not shown, a left space of the cabinet 10 may be configured by a freezing compartment, and a right space of the cabinet 10 may be configured by a refrigerating compartment.

The door 20 may include a freezing compartment door 203 for opening and closing the freezing compartment and a refrigerating compartment door 204 for opening and closing the refrigerating compartment. The freezing compartment door 203 and the refrigerating compartment door 204 may be arranged in parallel to each other at right and left sides, and the refrigerating compartment and the freezing compartment may be configured to be opened and closed through rotation.

In the state in which the door 20 is closed, an outer appearance of the front surface of the refrigerator 1' may be defined by the door 20. The door 20 may include the door body 40 and the panel assembly 30. A detailed structure of the door 20 may be the same as the aforementioned embodiment and may be different therefrom except for the size and arrangement thereof, and thus a detailed description or illustration thereof may be omitted, and unexplained reference numerals in the drawings may refer to the aforementioned embodiment.

Color of the panel assembly 30 may be determined by the panel 31 configuring the front surface of the panel assembly 30. Thus, in the state in which the lighting device is turned off, the outer appearance of the front surface of the refrigerator 1' may be defined by color of the panel itself.

When the lighting device 36 is turned on under control of the controller 13, light emitted by the lighting device 36 may be seen through the panel 31 to change the panel 31 in color or brightness. In this case, under control of the controller 13, the lighting device 36 may emit light with various colors, and the panel 31 may be changed to various colors to shine. That is, in the state in which the door 20 is maintained to be assembled and mounted, color or brightness of the outer appearance of the front surface of the refrigerator 1' may be changed resulting in change in the outer appearance of the front surface.

As necessary, the refrigerating compartment door 204 and the freezing compartment door 203 may shine with different colors, and the refrigerating compartment door 204 and the freezing compartment door 203 may shine with color selected to harmonize with surrounding furniture or an installation environment to harmonize with a surrounding environment. When an installation or usage environment or a usage condition is change, the outer appearance of the front surface of the refrigerator 1' may be freely changed according to the change.

The refrigerator according to the proposed embodiment may expect the following effects.

According to the embodiments, the color of the light irradiated from the lighting device may be adjusted by the user's manipulation, and thus, the color of the panel defining the front surface of the refrigerator door may be changed to the selected color. Thus, there may be the advantage in that the color of the front surface of the refrigerator is changed to the desired color without replacing the panel.

Particularly, there may be the advantage in that the user is capable of quickly and easily changing the color of the outer appearance to the desired color at any time desired by the user in the state in which the panel is mounted, thereby improving the use convenience.

In addition, the state, the operation information, the information of the surrounding environment, and the like of the refrigerator may be displayed by changing the color of the panel, and thus, the user may intuitively recognize the information to further improve the use convenience.

In addition, the light guide plate irradiating the light emitted from the lighting device forward may have the size greater than that of the panel that defines the front surface of the refrigerator door. Thus, the light irradiated forward through the light guide plate may pass through the entire surface of the panel, and the entire panel may emit the light with the uniform brightness. In addition, there may be the advantage in that the color of the outer appearance of the front surface of the refrigerator door is seen uniformly.

Particularly, the light guide plate may have the size that protrudes more than each of the upper and lower ends of the panel, and the sufficient amount of light may be provided to the upper and lower ends of the panel to prevent the shading from occurring on the upper and lower ends of the panel that defines the entire front surface of the refrigerator door.

In addition, the mounting member on which the light guide plate is fixedly mounted may also have the size greater than that of the panel to prevent the end or boundary of the mounting member from being exposed through the panel and prevent the shading, which occurs while the light of the light guide plate is transmitted, from occurring so that the brightness of the panel is more uniformed.

In addition, in the state in which the size of the light guide plate is larger than that of the panel, even though the groove in which the upper end of the light guide plate is accommodated is disposed in the groove of the upper bracket to increase in size of the light guide plate, the total size of the panel assembly may be prevented from excessively increasing.

That is, even in the state in which the light guide plate having the size greater than that of the panel is mounted, there may be the advantage in that the height of the upper bracket assembly protruding to the outside of the panel is minimized to minimize the protrusion of the circumferential portion of the panel assembly, thereby improving the outer appearance.

In addition, even when the light guide plate is expanded according to the temperature, there may be the advantage in that the space in which the upper end of the light guide plate is expandable inside the groove to maintain the stably mounted state without bending or deforming the light guide plate.

In addition, the panel and the light guide plate may have the structures that are fixedly mounted on the front and rear surfaces of the mounting member, respectively, and may have the structure in which the upper and lower ends of the panel, the light guide plate, and the mounting member are shielded by the upper bracket and the lower bracket.

Therefore, the panel assembly may have the more compact and neat outer appearance to improve the outer appearance and have the more compact fixing structure to improve the assembly productivity and the service performance.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
a cabinet that defines a storage space; and
a door configured to open and close at least a portion of the storage space, the door comprising a door body and a panel assembly disposed at a front side of the door body,
wherein the panel assembly comprises:
a lighting device configured to emit light,
a panel that defines a front surface of the door and is configured transmit the light,
a light guide plate disposed rearward relative to the panel and configured to guide the light emitted from the lighting device to the panel, and an upper bracket that is disposed above the panel and defines a top surface of the panel assembly, the upper bracket accommodating an upper end of the light guide plate that extends upward relative to an upper end of the panel.

2. The refrigerator according to claim 1, wherein the upper bracket defines a groove that is recessed from a bottom surface of the upper bracket and accommodates the upper end of the light guide plate facing the bottom surface of the upper bracket.

3. The refrigerator according to claim 2, wherein the groove of the upper bracket is recessed upward relative to a front end of the bottom surface of the upper bracket.

4. The refrigerator according to claim 2, wherein the light guide plate is made of a material that expands and contracts by heat, and
wherein the groove is recessed upward relative to a maximum expansion height of the light guide plate.

5. The refrigerator according to claim 1, further comprising a mounting member configured to transmit light and disposed between the panel and the light guide plate,
wherein the light guide plate is disposed on the mounting member.

6. The refrigerator according to claim 5, wherein the mounting member comprises:
a front surface portion that has a plate shape and is disposed between the panel and the light guide plate, the front surface portion facing the panel; and
side surface portions that extend rearward from lateral side ends of the front surface portion and are coupled to lateral side ends of the light guide plate, respectively.

7. The refrigerator according to claim 6, wherein an upper end of the front surface portion is disposed at or above the upper end of the panel.

8. The refrigerator according to claim 6, wherein the upper bracket accommodates an upper end of the front surface portion.

9. The refrigerator according to claim 6, wherein the upper bracket defines a groove at a bottom surface thereof, and
wherein an interior of the groove is partitioned into:
a light guide plate accommodation portion that accommodates the upper end of the light guide plate; and
a mounting member accommodation portion that is disposed forward relative to the light guide plate accommodation portion and accommodates an upper end of the front surface portion.

10. The refrigerator according to claim 9, wherein a horizontal length of the mounting member accommodation portion is greater than a horizontal length of the light guide plate accommodation portion.

11. The refrigerator according to claim 9, wherein a shape of the groove corresponds to a cross-sectional shape of the front surface portion and the light guide plate to thereby receive the upper ends of the front surface portion and the light guide plate.

12. The refrigerator according to claim 6, wherein the side surface portions extend in a vertical direction along left and right ends of the light guide plate, respectively,
wherein each of the side surface portions defines a light guide plate insertion space that extends in the vertical direction and receives one of the left end or the right end of the light guide plate,
wherein the upper end of the light guide plate passes through upper ends of the side surface portions and is disposed above the upper ends of the side surface portions, and
wherein a lower end of the light guide plate passes through lower ends of the side surface portions and is disposed below the lower ends of the side surface portions.

13. The refrigerator according to claim 6, wherein the upper bracket defines a groove at a bottom surface thereof, the groove receiving an upper end of the front surface portion of the mounting member, and
wherein an upper end of each of the side surface portions is stepped downward with respect to the upper end of the front surface portion and supports the bottom surface of the upper bracket.

14. The refrigerator according to claim 1, wherein the upper bracket comprises a bracket protrusion that protrudes forward from a front end of the upper bracket, and
wherein at least a portion of the bracket protrusion extends downward and defines a lower end of the bracket protrusion that is disposed below the upper end of the light guide plate.

15. The refrigerator according to claim 14, wherein the bracket protrusion extends toward the upper end of the panel and covers a front side of the upper end of the light guide plate.

16. The refrigerator according to claim 14, wherein the top surface of the panel assembly defined by the upper bracket comprises:
a horizontal portion that extends forward from a rear end of the upper bracket; and an inclined portion that extends forward from a front end of the horizontal portion and is
inclined downward with respect to the horizontal portion, and wherein the bracket protrusion protrudes downward from a front end of the inclined portion.

17. The refrigerator according to claim 1, wherein a lower end of the light guide plate is disposed below a lower end of the panel.

18. The refrigerator according to claim 17, further comprising a lower bracket that is disposed below the panel and defines a bottom surface of the panel assembly,
- wherein the lighting device is disposed inside the lower bracket and configured to emit light to the lower end of the light guide plate.

19. The refrigerator according to claim 18, wherein the lower bracket comprises a front surface portion that supports the panel,
- wherein the lower end of the panel is supported on an upper end of the front surface portion of the lower bracket, and
- wherein the lower end of the light guide plate is inserted into the lower bracket through the upper end of the front surface portion of the lower bracket.

20. The refrigerator according to claim 18, wherein the panel assembly further comprises a reflective layer that faces the light guide plate and is configured to reflect the light into an inside of the light guide plate, and
- wherein the reflective layer is disposed at each of the upper end of the light guide plate, a left end of the light guide plate, and a right end of the light guide plate.

* * * * *